(12) United States Patent
Geier et al.

(10) Patent No.: US 7,828,978 B2
(45) Date of Patent: Nov. 9, 2010

(54) SIMULTANEOUS SYNTHESIS AND PURIFICATION OF A FATTY ACID MONOESTER BIODIESEL FUEL

(76) Inventors: Doug Geier, 2840 Marcella Dr., Decatur, IL (US) 62521; John G. Soper, 1320 Florian Ave., Mt. Zion, IL (US) 62549

( * ) Notice: Subject to any disclaimer, the term of this patent is extended or adjusted under 35 U.S.C. 154(b) by 803 days.

(21) Appl. No.: 11/449,199

(22) Filed: Jun. 8, 2006

(65) Prior Publication Data
US 2007/0158270 A1    Jul. 12, 2007

Related U.S. Application Data

(60) Provisional application No. 60/758,080, filed on Jan. 11, 2006.

(51) Int. Cl.
| | |
|---|---|
| B01D 15/08 | (2006.01) |
| C07C 51/00 | (2006.01) |
| C02F 1/28 | (2006.01) |
| C07C 51/43 | (2006.01) |

(52) U.S. Cl. ............ 210/656; 210/198.2; 210/659; 502/11; 554/124; 554/161; 554/163; 554/167; 554/174

(58) Field of Classification Search ............ 210/198.2, 210/656, 659; 554/124, 161, 163, 167, 174
See application file for complete search history.

(56) References Cited

U.S. PATENT DOCUMENTS

| | | | |
|---|---|---|---|
| 4,652,406 A | 3/1987 | Lepper et al. | |
| 4,698,186 A | 10/1987 | Jeromin et al. | |
| 5,302,746 A | 4/1994 | Koono et al. | |
| 5,302,748 A | 4/1994 | Krbechek | |
| 5,354,878 A | 10/1994 | Connemann et al. | |
| 5,399,731 A | 3/1995 | Wimmer | |

(Continued)

FOREIGN PATENT DOCUMENTS

EP    0184740 B1    3/1991

OTHER PUBLICATIONS

Vicente, G., Coteron, A., Martinez, M., Aracil, J., Application of the factorial design of experiments and response surface methodology to optimize biodiesel production, Industrial Crops & Products, vol. .8 (1998), pp. 29-35.

(Continued)

*Primary Examiner*—Krishnan S Menon
*Assistant Examiner*—Katherine Zalasky

(57) ABSTRACT

Simultaneous synthesis and purification of a fatty acid monoester biodiesel fuel from a triacylglycerol feedstock is described. In an exemplary method, the triacylglycerol feedstock is continuously contacted with a catalytic chromatographic bed comprising a first (solid phase) basic catalyst through a first port of a simulated moving bed chromatographic apparatus. A monohydric alcohol and optional second (mobile phase) basic catalyst is continuously contacted with the catalytic chromatographic bed through a second port and pumped in a first direction toward the triacylglycerol feedstock to contact the triacylglycerol in a reaction zone of the catalytic chromatographic bed where the fatty acid monoester and glycerol coproduct are formed. The fatty acid monoester is removed from the reaction zone through a product port of the simulated moving bed apparatus. Segments of the catalytic chromatographic bed are incrementally moved in a second direction, opposite the first direction, and the glycerol is removed from a raffinate port located opposite the product port of the apparatus.

25 Claims, 13 Drawing Sheets

U.S. PATENT DOCUMENTS

| | | | |
|---|---|---|---|
| 5,405,992 A * | 4/1995 | Funk et al. | 560/265 |
| 5,424,466 A | 6/1995 | Stern et al. | |
| 5,455,370 A | 10/1995 | Demmering et al. | |
| 5,468,887 A | 11/1995 | Gupta | |
| 5,508,457 A | 4/1996 | Bayense et al. | |
| 5,514,820 A | 5/1996 | Assmann et al. | |
| 5,525,126 A | 6/1996 | Basu et al. | |
| 5,536,856 A | 7/1996 | Harrison et al. | |
| 5,618,972 A | 4/1997 | Funk et al. | |
| 5,703,272 A | 12/1997 | Abe et al. | |
| 5,713,965 A | 2/1998 | Foglia et al. | |
| 5,773,636 A | 6/1998 | Demmering et al. | |
| 5,849,939 A | 12/1998 | Mittelbach et al. | |
| 5,876,621 A * | 3/1999 | Sapienza | 252/70 |
| 5,908,946 A | 6/1999 | Stern et al. | |
| 5,993,684 A * | 11/1999 | Back et al. | 252/70 |
| 6,013,817 A | 1/2000 | Stern et al. | |
| 6,127,560 A | 10/2000 | Stidham | |
| 6,211,390 B1 | 4/2001 | Peter et al. | |
| 6,262,285 B1 | 7/2001 | McDonald | |
| 6,359,157 B2 | 3/2002 | Peter et al. | |
| 6,376,701 B1 | 4/2002 | Chavan et al. | |
| 6,398,707 B1 | 6/2002 | Wu et al. | |
| 6,399,800 B1 | 6/2002 | Haas et al. | |
| 6,407,269 B2 | 6/2002 | Kaita et al. | |
| 6,440,057 B1 | 8/2002 | Ergun et al. | |
| 6,489,496 B2 | 12/2002 | Barnhorst et al. | |
| 6,570,030 B2 | 5/2003 | Goto et al. | |
| 6,586,609 B2 | 7/2003 | Ruggieri et al. | |
| 6,642,399 B2 | 11/2003 | Boocock | |
| 6,696,583 B2 | 2/2004 | Koncar et al. | |
| 6,712,867 B1 | 3/2004 | Boocock | |
| 6,768,015 B1 | 7/2004 | Luxem et al. | |
| 6,812,359 B2 | 11/2004 | Goto et al. | |
| 6,818,026 B2 | 11/2004 | Tateno et al. | |
| 6,822,105 B1 | 11/2004 | Bernhardt et al. | |
| 6,855,838 B2 | 2/2005 | Haas et al. | |
| 6,890,451 B2 * | 5/2005 | Sapienza et al. | 252/70 |
| 7,108,789 B2 * | 9/2006 | Chiang et al. | 210/638 |
| 2002/0013486 A1 | 1/2002 | Ergun et al. | |
| 2002/0035282 A1 | 3/2002 | Suppes | |
| 2003/0010716 A1 * | 1/2003 | Wankat | 210/638 |
| 2003/0032826 A1 | 2/2003 | Hanna | |
| 2003/0078448 A1 * | 4/2003 | Buchanan et al. | 558/277 |
| 2003/0167681 A1 | 9/2003 | Delgado Puche | |
| 2003/0229237 A1 * | 12/2003 | Haas et al. | 554/174 |
| 2003/0229238 A1 | 12/2003 | Fleisher | |
| 2004/0054206 A1 | 3/2004 | Brunner et al. | |
| 2004/0106813 A1 | 6/2004 | Moritz et al. | |
| 2004/0159537 A1 | 8/2004 | Maeda et al. | |
| 2004/0231234 A1 | 11/2004 | May et al. | |
| 2004/0254387 A1 | 12/2004 | Luxem et al. | |
| 2005/0020842 A1 | 1/2005 | Haas et al. | |
| 2005/0063954 A1 | 3/2005 | Lee et al. | |
| 2005/0169059 A1 | 8/2005 | Perner et al. | |
| 2005/0204612 A1 | 9/2005 | Connemann et al. | |
| 2005/0274065 A1 * | 12/2005 | Portnoff et al. | 44/605 |
| 2007/0282118 A1 | 12/2007 | Gupta et al. | |

OTHER PUBLICATIONS

Simone C.M. dos Reis, et al., Transesterification of Brazilian Vegetable Oils with Methanol over Ion-Exchange Resins, JAOCS, vol. 82, No. 9 (2005), pp. 661-665.

B. Freedman, E.H. Pryde, T.L. Mounts; Variables Affecting the Yields of Fatty Esters from Transesterified Vegetable Oils; Northern Regional Research Center, Agricultural Research Service, U.S. Department of Agriculture, Peoria, IL 61604;pp. 1638-1643; JAOCS, vol. 61, No. 10 (Oct. 1984); US.

Reedman et al, Transesterification Kinetics of Soybean Oil, Northern Regional Research Center, Agricultural Research Service U.S. Department of Agriculture, Il 61604, pp. 1375-1380, JAOCS, vol. 63 No. 10, Oct. 1986.

Knothe et al, The Biodiesel Handbook, pp. 34, AOCS Press, Urbana Il 61802, 2005, US.

Vicente et al., Application of the Factorial design of experiments and response surface methodology to optimize biodiesel production, Industrial Crops and Products an International Journal, 1998, pp. 29-35, Madrid Spain.

Bondioli, The preparation of fatty acid esters by means of catalytic reactions, Topics in Catalysis vol. 27, Nos. 1-4, Feb. 2004, pp. 77-82, Plenum Publishing Company, USA.

Ion exchange resins absorb impurities in biodiesal production, Lanxess AG, Oct. 24, 2006, pp. 1-2.

* cited by examiner

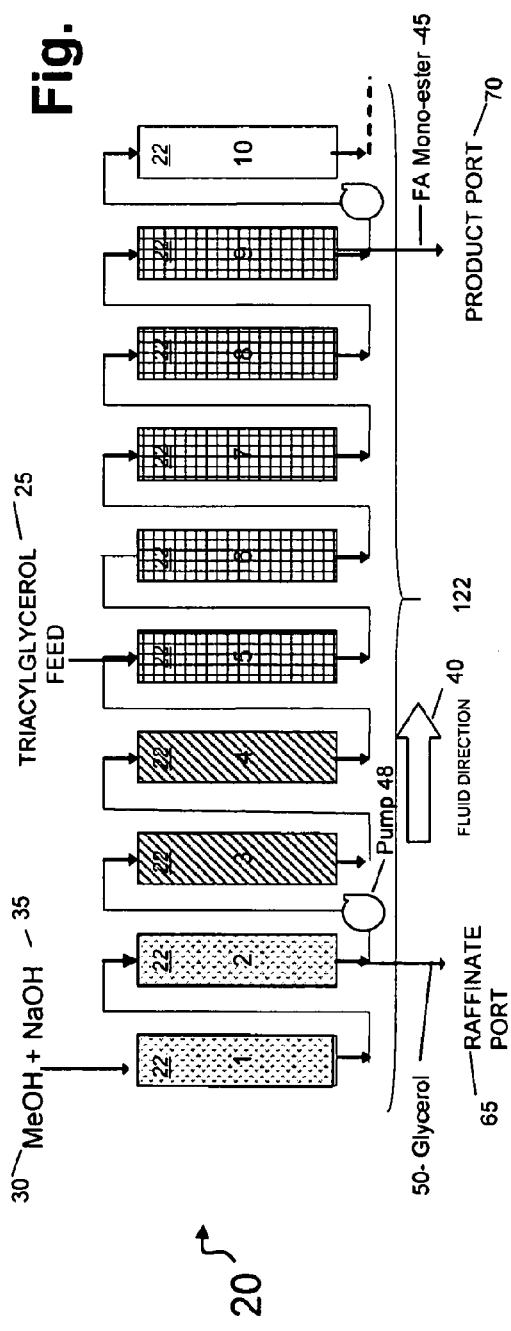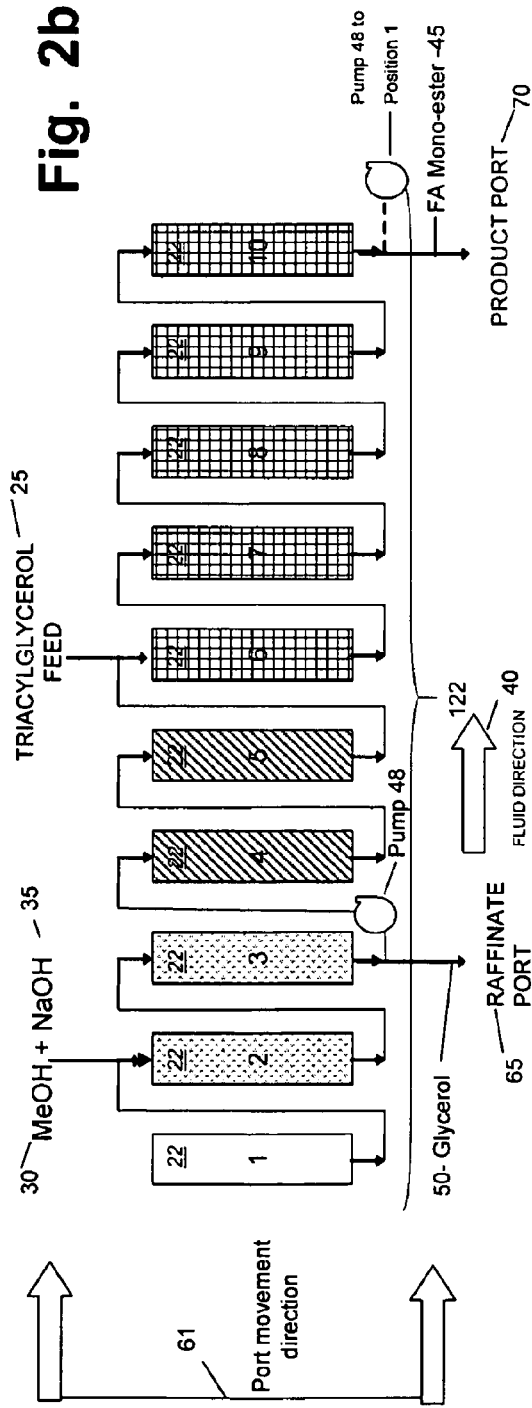

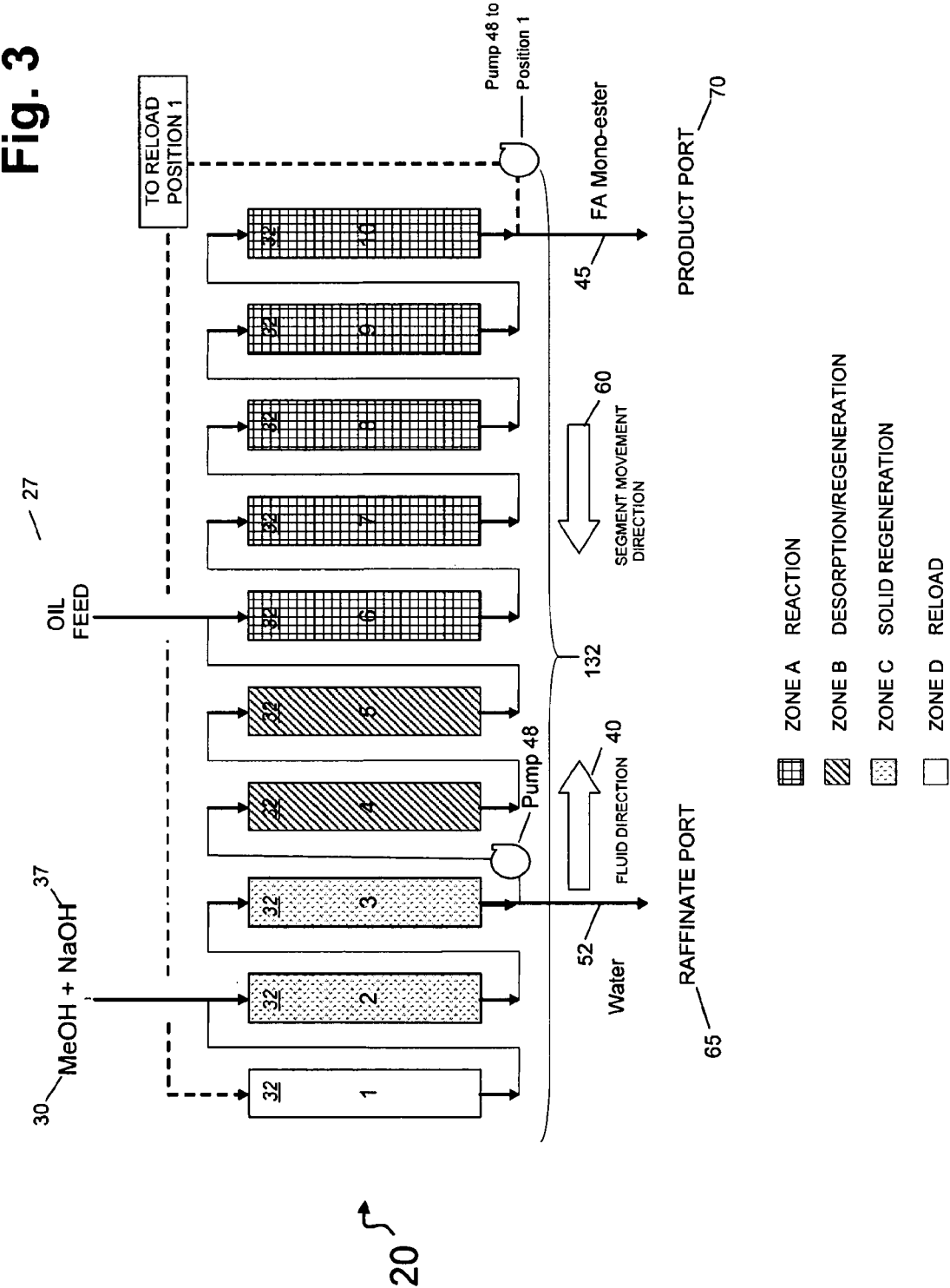

SIMULTANEOUS SYNTHESIS AND PURIFICATION OF A FATTY ACID MONOESTER BIODIESEL FUEL

CROSS-REFERENCE TO RELATED APPLICATION(S)

This application claims priority to U.S. Provisional Patent application No. 60/758,080, filed Jan. 11, 2006, which is incorporated herein by reference.

TECHNICAL FIELD

This application relates to synthesis of fatty-acid monoesters for biodiesel fuel by transesterifying triacylglycerol containing oils with an alcohol, particularly to performing the transesterification on a catalytic chromatographic bed material, more particularly to simultaneously purifying the fatty acid monoester product over the chromatographic bed material, and still more particularly to using a simulated moving bed apparatus to continuously perform the simultaneous synthesis and purification.

INTRODUCTION

Biodiesel fuels are fatty acid monoesters made from naturally occurring oils, most typically plant oils primarily composed of triacylglycerol lipids. One method of making biodiesel begins by hydrolyzing fatty acids from the triacylglycerol to form glycerol and free fatty acids, then separating the free fatty acids from the glycerol, then reacting the fatty acids with a monohydric alcohol in the presence of a liquid phase acid catalyst to form the fatty acid monoester and water, and finally separating the fatty acid monoester from the water. While acid hydrolysis followed by esterification is chemically efficient, the overall process requires two different chemical reactions and two different separations steps and is therefore not economically efficient.

Another method of making biodiesel uses direct alcoholytic transesterification of the triacylglycerol with the monohydric alcohol to form the fatty acid monoester and glycerol followed by separation of the fatty acid monoester from the glycerol. Alcoholytic transesterification of a triacylglycerol is described by the formula:

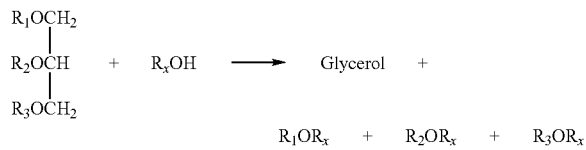

Where $R_1$, $R_2$ and $R_3$ are the same or different alkyl and/or alkenyl hydrocarbon chains of 12-20, and more typically 14-18 carbons in length, where O is oxygen bonded to the end carbon of the alky or alkenyl hydrocarbon as a fatty acid in ester linkage to glycerol, where $R_xOH$ is a monohydric alcohol, typically an alkanol; and wherein $R_1OR_x$, $R_2OR_x$, and $R_3OR_x$ are each fatty acid monoesters corresponding to the fatty acids of the triacylglycerol. In typical embodiments for making biodiesel fuels $R_xOH$ is methanol or ethanol. Essentially, each of the ester bonds of the triacylglycerol that link the fatty acid R groups to glycerol are transferred to the $R_x$ to form free glycerol. This method is more efficient because only a single reaction and single separation step are performed. Efficient performance of the reaction requires the presence of a catalyst.

The most widely used catalyst is hydroxide in liquid form, typically sodium hydroxide or potassium hydroxide dissolved in methanol making a methoxide, ion, which is highly reactive. The amount of hydroxide catalyst required for efficient alcoholytic transesterification is at least 0.75% wt/vol hydroxide to methanol, and more typically about 1% to 5% wt/vol. Even at these amounts however, the reaction typically converts only about 80% of the triacylglycerols into fatty acid monoesters before obtaining thermodynamic equilibrium. To get more efficient conversion requires separation of the products from the reaction mixture to drive the equilibrium toward product formation. The glycerol is more dense than the fatty acid monoesters and is typically separated by gravity settling. Unreacted alcohol is typically separated from fatty acid monoesters by water washing and distillation or centrifugation. U. S. Pat. No. 6,262,285 describes a process for continuous synthesis by continuous decantation of glycerol or fatty acid monoester from a gravity settled reaction mixture. With efficient separation of the products the reaction can be driven to about greater than 99% conversion. However, such methods require multistage operation, such as several discrete unit operations. For example, multiple reactors may be required, with separation steps interposed between reactors, for continuous synthesis and separation of the products in discrete unit operations. There remains a need in the art for a single, convenient process that provides continuous and simultaneous synthesis and purification of fatty acid alkyl esters.

One of the drawbacks of using the hydroxide catalyst, however, is that unwanted saponified coproducts (e.g. sodium salts of fatty acids) are made from any free fatty acids that may be present in the oil mixture. Most naturally occurring oils contain a small percentage of free fatty acids, the amount of which increases with storage time of the oil. Methods using dissolved basic catalysts, such as sodium hydroxide, are often accompanied by some saponification of acylglycerol feed or ester product to form fatty acid soaps, resulting in losses when the resulting soap partitions into the glycerol coproduct. Some saponified fatty acids will be incorporated in the fatty acid monoester product, and must be separated from the fatty acid monoesters because even small amounts can foul processing equipment and will produce a biodiesel fuel that is unusable. The fatty acid soap in glycerol must be removed from the glycerol, so acid is added to the glycerol to neutralize the soaps and generate salt and a free fatty acid which can be removed by gravity separation such as centrifugation or skimming. However, the resulting content of salt in the glycerol coproduct is a significant impurity and costly processes are required to remove it.

A variety of other catalyst and configurations of equipment have been described in the art for biodiesel production by alcoholytic transesterification of acylglycerols or esterification of free fatty acids as briefly summarized below.

U.S. Pat. No. 5,354,878 describes production of lower alkyl esters of higher fatty acids from an oil phase and lower alcohols by catalytic transesterification in the presence of an alkaline catalyst, that includes a) introducing a mixture of oil phase, alcohol and catalyst at reaction temperature into the top of a first reactor column, at a rate of flow which is lower than the sinking rate of the glycerine separated from the reaction mixture, b) the reaction mixture is passed into a second reactor for further transesterification, c) the thus obtained reaction mixture is further freed of glycerine in an initial separating stage by means of a short-term washing, d) the reaction mixture is passed into a third reactor with addition of further alcohol and catalyst, and at a rate of flow conforming to the first stage of the process, e) the reaction mixture is further transesterified, f) reaction product is freed of the remaining methanol, glycerine, soaps formed and catalyst in a second separating stage, under addition of an aqueous extraction buffer solution, and g) the reaction mixture is freed of lower alcohols by stripping, washed with suitable extraction and washing solutions and dried.

U.S. Pat. No. 5,399,731 describes a process for the production of the fatty acid esters of lower monovalent alcohols by transesterification of fatty acid glycerides in the presence of basic catalysts. The process is characterized in that the transesterification is carried out in the presence of 0.025 to 0.045 moles of an alkali or alkaline earth metal compound, preferably sodium hydroxide, potassium hydroxide, sodium or potassium alcoholate, based on 100 g of fatty acid glyceride (about 1.0%-1.8% wt/wt hydroxide) and the subsequent purification of the fatty acid esters is effected by the addition of 0.3 to 3.0 percent of water by hydration and separation of the catalyst residues and other impurities.

U.S. Pat. No. 5,424,466 describes a process for the production of esters from fatty substances having a natural origin (animal and vegetable oils) and low molecular weight alcohols, in which the soaps and oily compounds entrained in the alkaline phases are recycled by treating them, following acidification and separation, with a fraction of the glycerol phase produced, in the presence of an alkaline catalyst and for forming preferably a triglyceride or a partly substituted glyceride.

U.S. Pat. No. 5,468,887 describes a method of preparing esters and water soluble soaps using intensive mixing. The esters are prepared by reacting fats & oils with methanol containing caustic as a catalyst wherein the glycerin formed is removed. The resulting esters are saponified with caustic along with an additional amount of methanol to form the soap.

U.S. Pat. No. 5,514,820 describes a continuous process for the production of lower alkyl esters by reaction of fatty acid triglycerides containing less than 1% free fatty acid with a lower alcohol in two stages in the presence of a homogeneous alkaline catalyst, the glycerol formed being removed after the first stage. To enable the process to be carried out with high yields the reaction mixture is passed through a reactor and a following static separator once in each stage. Tube reactors are used as the reactors.

U.S. Pat. No. 6,013,817 describes production of ethyl esters of fatty acids from fatty acid glycerides such as vegetable or animal oil or fat or other mixtures of glycerides, the process comprises the following stages: (a) transesterifying fatty acid glycerides with hydrated ethyl alcohol using an alkaline catalyst to form a medium comprising ethyl esters and excess ethyl alcohol; (b) adding a glycerine phase to said medium, and evaporating the excess ethyl alcohol to produce two immiscible phases, an ester phase and a glycerine phase A, and recycling said excess ethyl alcohol to stage (a); (c) separating said glycerine phase A and said ester phase to obtain the desired ethyl esters; (d) neutralizing said glycerine phase A with acid, and separating resultant "fatty acids+ esters" phase and a glycerine phase B, and drying the latter phase; (e) subjecting the "fatty acids+esters" phase to glycerolysis with at least a fraction of the dried glycerine phase B in the presence of an alkaline catalyst to form a mixture of glycerides and esters, and passing said mixture into transesterification stage (a).

U.S. Pat. No. 6,127,560 describes soybean oil introduced into a stirred reactor where lower aliphatic monohydric alcohol and an alkaline catalyst is introduced. Alcoholysis proceeds to virtual completion. A lower alkyl alcohol ester phase is separated out and washed with water to remove traces of unreacted alcohol and the alkaline catalyst.

U.S. Pat. No. 6,440,057 and 2002/0013486 describe a method for producing fatty acid methyl ester, including compounding saturated and unsaturated higher fatty substances from at least one of vegetable and animal with an alkaline solution dissolved in alcohol to form a mixture. The method also includes emulsifying the mixture to reach a chemical balance state in a reaction section, wherein fats are transesterified into fatty acid methyl ester, wherein border surfaces of the mixture are enlarged by dynamic turbulence in the reaction section and the transesterification is performed under pressure, and wherein the pressure is reduced during transesterification. The method further includes after reaching a chemical balance state, separating residues from the fatty acid methyl ester in a phase separation section.

U.S. Pat. No. 6,489,496 describes a process for making an alkyl ester of a carboxylic acid via transesterification comprising the steps of: (1) reacting a carboxylic acid ester with an alcohol and an effective amount of a transesterification catalyst in a reaction zone to form a reaction mixture comprised of a product ester and a product alcohol; (2) passing the reaction mixture from step (1) through a centrifugal separation zone wherein the second alcohol is separated from the second ester.

U.S. Pat. No. 6,570,030 describes fatty acid ester prepared by treating botanical seeds or fruits with a monohydric alcohol having 1 to 10 carbon atoms under pressure at a temperature of at least 180° C. under supercritical conditions.

U.S. Pat. No. 6,712,867 describes a process for the esterification of a triglyceride that includes forming a single phase solution of said triglyceride in an alcohol selected from methanol and ethanol, the ratio of alcohol to triglyceride being 15:1 to 35:1. The solution further comprises a co-solvent in an amount to effect formation the single phase and a base catalyst for the esterification reaction. After a period of time, ester is recovered from the solution.

US 2002/0035282 describes a process for the carbonate-catalyzed alcoholysis of fatty acid glycerides is disclosed, wherein an alcohol (e.g., a C1-C6 mono-, di- or trialcohol) is reacted with a fatty acid glyceride (e.g., a plant or animal derived triglyceride) at elevated temperatures and superatmospheric pressures to give high yields of the corresponding ester. The preferred catalysts are the alkali metal, alkaline earth metal or zinc carbonates, with calcium carbonate being especially preferred. The alcoholysis reaction may be carried out in a single reactor, or on a continuous basis using a plug flow reactor.

US 2004/0054206 describes a method for pretreating crude oils and fats for subsequent alkaline transesterification with primary and/or secondary alcohols. The raw oil or fat loaded with slimy substances is combined in a mixture that includes oil or fat comprising an alcohol and concentrated acid, and preferably is subsequently rinsed with an alkaline glycerol phase arising from an alkaline transesterification reaction of the above-mentioned type. After the rinsing process, the glycerol phase which is loaded with slimy substances and soaps of free fatty acids is separated as a heavy phase of neutral oil liberated from free fatty acids.

US 2004/0159537 describes a method for producing fatty acid alcohol ester in which an ester interchange reaction between fats or oils and alcohol is carried out in a reactor 1 by applying ultrasonic irradiation at a frequency of 15 to 100 kHz and irradiation intensity of 0.5 to 20 W/cm2 in the presence of a catalyst, followed by an application of ultrasonic irradiation at a frequency of 200 to 3,000 kHz and irradiation intensity of 0.5 to 20 W/cm2 to the reaction product in a separation tank to separate fatty acid alcohol ester and glycerol. Such ultrasonic irradiation in the separation tank may be applied to an interface between fatty acid alcohol ester and glycerol.

US 2004/0231234 describes processes of esterification of C18, C18:1 and C18:2 mixed fatty acids with methanol or ethanol, or fractional distillation of methyl or ethyl esters of palm oil, palm kernel oil and palm oil products, or fractional distillation of methyl or ethyl esters of palm oil, palm kernel oil and palm oil products, followed by crystallization, or crystallization of methyl or ethyl esters followed by fractional distillation.

US 2005/0016059 describes a method for transesterifying a refined vegetable oil in a homogenous phase with a C1-C4 alkanol in the presence of an aliphatic hydrocarbon solvent with a boiling point of 40-200° C. and a catalyst where the aliphatic hydrocarbon solvent is used in an amount of at least 0.2 parts by volume relative to the unit volume of the refined vegetable oil.

U.S. Pat. No. 6,211,390 describes a method for producing fatty acid esters by transesterification with a monovalent low-molecular weight alcohol in the presence of a homogeneous or heterogeneous catalyst where the formed fatty acid ester is extracted from the reaction mixture by means of a near-critical extractant. Preferred extractants are carbon dioxide, propane, butane, dimethyl ether, ethyl acetate or mixtures thereof.

US 2003/0229238 describes a process for converting at least one triglyceride feedstock to at least one fatty-acid methyl ester that uses a continuous, plug-flow environment with a single-pass residence time as low as about 10 seconds, and a conversion of at least 70 percent.

U.S. Pat. No. 6,818,026 describes a process for producing a fatty acid ester with a high yield from an oil or fat and an alcohol which comprises reacting an oil or fat with an alcohol in the presence of a solid base catalyst under conditions in which at least one of the oil or fat and the alcohol is in a supercritical state at a temperature exceeding 260° C.

US 2005/0020842 describes a method for producing fatty acid alkyl esters, involving transesterifying a feedstock containing lipid-linked fatty acids with an alcohol and an alkaline catalyst to form fatty acid alkyl esters where the feedstock has not been previously treated to release the lipid components of said feedstock, or has been previously treated to release lipid components and the feedstock contains <about 20% lipids.

U.S. Pat. No. 6,262,285 describes a low pressure process for the dry synthesis and continuous separation of products from the transesterification of triglycerides, comprising the steps of: (a) providing a catalyst at a first predetermined rate and providing methanol at a second predetermined rate; (b) mixing said catalyst and said methanol to form a feed solution; (c) providing triglycerides at a third predetermined rate; (d) mixing said triglycerides with said feed solution at a pressure, temperature and rate sufficient to produce a transesterified product having methyl ester and glycerol fractions, each of said fractions having a methanol component; (e) continuously separating said methyl ester fraction from said glycerol fraction by decantation in a manner so as to produce a dry methyl ester fraction substantially free of glycerol, thereby eliminating washing of glycerol from said dry methyl ester fraction; and (f) recovering excess methanol from each of said fractions using a dry vacuum system so as to produce a clean methyl ester product from one of said fractions, a crude glycerin product from the other of said fractions and recovered excess methanol substantially free of water from each of said fractions.

U.S. Pat. No. 6,642,399 describes process for the esterification of a mixture of fatty acids and triglycerides that comprises forming a single phase solution of fatty acids and triglyceride in an alcohol in a solution that further comprises a co-solvent in an amount to form the single phase. In a first step, an acid catalyst for the esterification of the fatty acids is added. After a period of time, the acid catalyst is neutralized and a base catalyst for the transesterification of triglycerides is added. After a further period of time, esters are separated from the solution.

U.S. Pat. No. 6,696,583 describes a method for the preparation of fatty acid alkyl esters by transesterification wherein from a reaction mixture in which the transesterification is carried out, an ester phase containing fatty acid alkyl esters and a glycerol phase containing fatty acids are separated from each other, and the fatty acids are separated from the glycerol phase, whereby a fatty acid phase containing fatty acids is formed, which fatty acids are esterified with an alcohol, which method is characterized in that the fatty acid phase is mixed with a further mixture of triglycerides and fatty acids and the fatty acids contained in the obtained mixture are esterified with an alcohol, whereby an esterification mixture containing triglycerides and fatty acid alkyl esters is obtained, which esterification mixture is transesterified with alcohol so as to form further fatty acid alkyl esters.

US 2003/0167681 describes a procedure for transesterification of triglycerides with alcohols such as methanol or ethanol, optionally in the presence of methyl or ethyl acetates of fatty acids and an inert solvent, to produce methyl or ethyl esters of fatty acids, glycerine and, where appropriate, glycerine triacetate, followed by the separation of crude glycerine that is reacted with aldehydes, ketones and/or acetic acid or methyl or ethyl acetates to produce acetals, glycerine cetals and/or glycerine acetates.

U.S. Pat. No. 5,849,939 describes a method for the preparation of fatty acid alkyl esters by transesterification, wherein from a reaction mixture in which the transesterification is carried out, an ester phase and a glycerol phase containing fatty acids, fatty acid salts and/or other fatty acid compounds are formed, which are separated from each other, characterized in that the fatty acids, the fatty acid salts and/or other fatty acid compounds are separated from the glycerol phase, esterified with an alcohol and recycled to a different reaction mixture, in which a further transesterification is carried out.

US 2003/0032826 describes a process for the production of fatty acid esters from a triglyceride feedstock that comprises introducing a catalyst and a triglyceride feed stream comprising the triglyceride feedstock into a reaction zone and introducing an alcohol into the feed stream within the reaction zone to form a product mixture comprising fatty acid esters, glycerol and unreacted alcohol. The feed stream into which the alcohol is introduced is characterized as having a Reynolds number of at least about 2100. It further describes a process and apparatus for introducing the alcohol into the triglyceride feed stream via a distributed feed system.

US 2005/0204612 describes an integrated combination of acid catalyzed and base catalyzed fatty acid ester synthesis which allows the use of oils which are high in free fatty acids. And a method for the continuous production of biodiesel from biogenic fat- or oil-containing starting mixtures with a high content of free fatty acids as well as a device for producing biodiesel.

U.S. Pat. No. 5,302,746 describes a process for producing a carboxylic acid ester which comprises reacting a carboxylic acid with an alcohol in the presence of an acid catalyst to produce a reaction solution and neutralizing the reaction solution, characterized by using a countercurrently contacting column for neutralization, into which the esterified reaction solution is introduced at the lower portion of the column, an aqueous strong alkaline solution at a middle portion and an aqueous weak alkaline solution at an upper portion, removing a neutralized oil phase containing the carboxylic acid ester from the top of the column and removing an aqueous phase from the bottom, thereby continuously neutralizing the reaction solution.

U.S. Pat. No. 5,302,748 describes a process for preparing esters of an alcohol and a carboxylic acid employing sulfuric acid in an amount effective to both catalyze the reaction and to remove or immobilize the water of reaction whereby an ester is provided in increased yield and purity.

U.S. Pat. No. 5,455,370 describes a process where fatty acid glycerides can be transesterified with lower aliphatic alcohols if the reaction is carried out in the presence of fatty acids.

U.S. Pat. No. 5,773,636 describes a process for the production of fatty acid lower alkyl esters comprising the steps of: A) treating at least one fatty acid ester of glycerol with from about 0.3 to about 3% by weight, based on the weight of ester, of an acid at an elevated temperature; B) removing said acid from the treated fatty acid ester; and C) reacting the treated fatty acid ester with at least one lower aliphatic alcohol to transesterify the fatty acid ester.

U.S. Pat. No. 6,399,800 describes a method for producing fatty acid alkyl esters from a feedstock, involving: (a) saponifying the feedstock with an alkali to form a saponified feedstock, (b) removing the water from the saponified feedstock to form a dried saponified feedstock containing no more than about 10% water, (c) esterifying the dried saponified feedstock with an alcohol in the presence of an inorganic acid catalyst to form fatty acid alkyl esters even with water present at levels up to about 3 wt %, and (d) recovering the fatty acid alkyl esters.

U.S. Pat. No. 6,855,838 describes a method for producing fatty acid alkyl esters, involving esterifying a material containing free fatty acids (FFA) with an alcohol and an inorganic acid catalyst to form a product containing fatty acid alkyl esters, wherein (i) the material contains at least about 40% FFA and is produced by reacting a feedstock with steam and sulfuric acid at a pH of about 1-about 2 or (ii) the material contains at least about 80% FFA and is produced by reacting a feedstock with steam and alkali at a pH of about 11-about 13 and further reacting the feedstock with steam and sulfuric acid at a pH of about 1-about 2.

US 2004/0254387 describes a method for making biodiesel from a vegetable oil source by simultaneously reacting free fatty acids and glycerides of the vegetable oil source with methanol, under pressure up to 250 psig. The conversion is catalyzed by an acid at temperatures between about 80° C. to about 200° C.

U.S. Pat. No. 6,768,015 describes a method for making alkyl esters, or methyl ester specifically, such as biodiesel, that involves simultaneously reacting the free fatty acids and glycerides of the oil source with methanol, under pressure up to 500 psia. The conversion is catalyzed by an acid at temperatures between about 80° C. to about 200° C.

US 2004/0106813 describes a method for the esterification of a fatty acid that is carried out in a column with a packing. In addition to functioning as a catalytic reactor, the packing functions as a stripping section. A heterogeneous catalysis of a fatty acid is carried out with an alcohol used in the same molar ratio or in excess. A gaseous alcohol-rich counter-flow is produced in a sump of the column by vaporization. Water is removed from the reaction zone by means of the counter-flow acting as a stripping gas. The loaded stripping gas is at least partially liquefied at the head of the column. The head product is separated into a water-rich fraction as well as an alcohol-rich fraction. The alcohol-rich fraction is returned to the process as a starting material for the esterification and for the production of the stripping gas.

U.S. Pat. No. 5,536,856 describes a method where esterification a carried out in a column reactor in which there is a plurality of esterification trays each having predetermined liquid hold-up and containing a charge of a solid esterification catalyst thereon. e.g. an ion exchange resin containing a —SO$_3$H and/or —COOH groups. A liquid phase containing the carboxylic acid component, e.g. a fatty acid mixture, flows down the column reactor from one esterification tray to the next downward one against an upflowing alcohol vapour stream, e.g. methanol vapour. Relatively dry alcohol vapour is injected into the bottom of the column reactor. Water of esterification is removed from the top of the column reactor in the vapour stream whilst ester product is recovered from the sump of the reactor. As the liquid flows down the trays it encounters progressively drier alcohol and the esterification equilibrium reaction is driven further and further towards 100% ester formation.

U.S. Pat. No. 5,618,972 describes a two-stage process where carboxylic acids alcohol and a catalyst are contacted with a first stage fixed catalyst bed containing a solid catalyst or mixture of catalysts effective to catalyze the reaction and form a mixture of reactants and products. This reaction mixture and a desorbent are then contacted with a second stage simulated moving bed containing a solid or a mixture of solids effective to catalyze the reaction and to selectively adsorb at least one component from the reaction mixture.

U.S. Pat. No. 6,812,359 describes a method for preparing a fatty acid ester with suppressing the discharge of unreacted reactants and/or intermediate products, which comprises reacting fats and oils with a monohydric alcohol in a reactor under conditions where the monohydric alcohol is in a supercritical state, wherein a reaction mixture containing unreacted reactants and/or intermediate products is recycled to the reactor.

U.S. Pat. No. 6,822,105 describes a method for making alkyl esters, or methyl ester that involves converting the free fatty acids of the oil source into a mixture of mono-, di, and tri-glycerides and subsequently transesterifying the newly formed glycerides as well as the originally present glycerides into fatty acid alkyl esters.

U.S. Pat. No. 5,508,457 describes a process for the transesterification of carboxylic acid esters, in which process a catalyst is used which is substantially insoluble in the reaction mixture under reaction conditions, said catalyst comprising at least one silicate of the Group IVB elements of the Periodic Table as the active component.

U.S. Pat. No. 5,525,126 describes a process for producing esters from a feedstock that includes a fat or an oil that uses as a catalyst, calcium acetate and barium acetate U.S. Pat. No. 5,713,965 describes a method that utilizes lipases to transesterify triglyceride-containing substances and to esterify free fatty acids to alkyl esters using short chain alcohols.

U.S. Pat. No. 6,359,157 describes a process for the transesterification of fat and/or oil of biological origin by means of alcoholysis with a view to eliminating the disadvantages of traditional transesterification processes, by using a metal salt of an amino acid or of an amino-acid derivative is used as catalyst, said metal salt being insoluble in alkanols.

U.S. Pat. No. 6,586,609 describes a process for the esterification of organic acids with alcohols in a reactor of the chromatographic type in which the heterogeneous solid phase is capable of acting both as an esterification catalyst and as a means exhibiting preferential adsorption towards one of the reaction products (typically water). The process is particularly improved compared with conventional technology owing to the use, as the means for regenerating the catalyst, of a desorbent to which has been added a second compound, generally the anhydride of the acid used in the esterification reaction, which, by chemical reaction, completes the removal of the adsorbed water.

U.S. Pat. No. 5,703,272 describes a process for preparing a carboxylic acid ester which includes subjecting a carboxylic acid and an alcohol or a phenol to an esterification reaction in the presence of a silica-titania catalyst.

U.S. Pat. No. 5,908,946 describes production of linear monocarboxylic acid esters with 6 to 26 carbon atoms from vegetable oils or animal oils and alcohol using a catalyst that is selected from among zinc oxide, mixtures of zinc oxide and aluminum oxide, and the zinc aluminates having more particularly a spinel type structure.

U.S. Pat. No. 6,398,707 describes a technique for enhancing the activity of an immobilized lipase, and a technique for regenerating a deactivated immobilized lipase, in which an alcohol with a carbon atom number not less than three is used to swell and/or clean said immobilized lipase. Said immobilized lipase is particularly useful in a method of preparing biodiesel by transesterification of triglycerides and a lower alcohol.

US 2005/063954 describes a fatty acid alkyl esters suitable for use as biodiesel produced by a single step esterification of free fatty acids and transesterification of triglycerides from vegetable oils or animal fats or combinations thereof with a lower alcohol (e.g. methanol) in presence of alkyl tin oxide as catalyst.

Despite the many techniques and equipment known in the art for production of biodiesel fatty acid monoesters from triacylglycerol, there remains a need for methods and systems that are cost efficient, relatively easy to operate and that can provide for continuous high yield preparation and high level purification of biodiesel fuels. In addition, there remains a need for methods and systems that can provide a glycerol coproduct that is low in chloride content. The present invention meets these needs and provides other advantages, including being readily adaptable to several of the foregoing methods of the prior art, as will be recognized from the disclosure that follows.

SUMMARY OF THE DISCLOSURE

In one aspect, there are provided processes for simultaneously synthesizing and purifying a fatty acid monoester by contacting a chromatographic bed material with an acylglycerol feedstock, a monohydric alcohol and a first catalyst to form the fatty acid monoester while simultaneously separating a fraction enriched with the fatty acid monoester from a fraction enriched with glycerol by sorbent chromatography over the chromatographic bed material. In certain embodiments, the sorbent chromatography executes a chromatographic separation. In other embodiments, the sorbent chromatography executes an adsorptive/desorptive separation. In certain embodiments the chromatographic bed material is a catalytic chromatographic bed material comprising the first catalyst.

In another aspect there is provided the foregoing processes where the catalytic chromatographic bed material is an ion exchange resin. Typically the ion exchange resin is selected from the group consisting of strong base resins, weak base resins, strong acid resins, weak acid resins, and nonfunctional resins. In certain embodiments, the basic catalytic chromatographic bed material is also contacted with a second catalyst, which in certain embodiments is a basic compound, and in particular embodiments is a hydroxide salt, typically of an alkali or alkaline earth metal. In certain embodiments the second catalyst is contacted with the monohydric alcohol prior to contacting the chromatographic bed and acylglycerol feedstock. Typically the monohydric alcohol is selected from the group consisting of methanol and ethanol and the acylglycerol comprises a triacylglycerol obtained from an oilseed plant.

In another aspect, any of the foregoing embodiments are executed in a configuration where the chromatographic bed material is contained within a simulated moving bed apparatus. In certain embodiments, the simulated moving bed apparatus comprises a plurality of movable column segments connected in sequential fluid series and includes in order, an eluent port to introduce the monohydric alcohol into the apparatus to contact the chromatographic bed material, a raffinate port to remove the glycerol from the apparatus, a feed port to introduce the acylglycerol into the apparatus to contact the chromatographic bed material, and a product port to remove the fatty acid monoester from the apparatus. Typically, the column segments are sequentially connected in a circular series. In these embodiments, the monohydric alcohol is introduced into the simulated moving bed apparatus and passes through the apparatus in a first flow direction and the column segments are collectively moved in a second direction opposite the first direction.

In other embodiments, the simulated moving bed apparatus comprises a plurality of column segments sequentially fluidly interconnected by moveable ports that include in order, an eluent port to introduce the monohydric alcohol into the apparatus to contact the chromatographic bed material, a raffinate port to remove the glycerol from the apparatus, a feed port to introduce the acylglycerol into the apparatus to contact the chromatographic bed material, and a product port to remove the fatty acid monoester from the apparatus. In these embodiments, the moveable ports are moved in a circular sequence over the column segments. Typically, the monohydric alcohol is introduced into the simulated moving bed apparatus in a first flow direction and the moveable ports are collectively moved to adjacent column segments in the same direction to simulate movement of the bed segments in a second direction opposite the first direction.

In these embodiments, the acylglycerol feed is contacted with the catalytic chromatographic bed material in a first zone and the glycerol is withdrawn from a second zone different than the first. The process may further include contacting the catalytic chromatographic bed with the monohydric alcohol in a third zone located upstream of the first and second zones with respect to a flow direction of the monohydric alcohol. Certain embodiments include contacting the catalytic chromatographic bed with the monohydric alcohol in the absence of any other catalyst in a fourth zone located between the first zone and the third zone.

In another aspect there are provided methods for continuous production of fatty acid monoester by the forgoing simulated moving bed processes. These methods operate wherein the contacting of the chromatographic bed material with the monohydric alcohol, acylglycerol feed and first catalyst with simultaneous sorbent chromatographic separation are conducted continuously with removal of the glycerol enriched effluent and removal of fatty acid monoester enriched effluent.

In a particular embodiment there is provided a process for simultaneously synthesizing and purifying a fatty acid monoester that includes, in a simulated moving bed apparatus comprising a plurality of column segments sequentially connected in series and containing a catalytic chromatographic bed material, simultaneously: a. feeding an acylglycerol feedstock into the apparatus at a feed port position to contact the chromatographic bed material at a column segment in a first zone; b. feeding a monohydric alcohol eluent reactant into the apparatus at an eluent port position to contact the chromatographic bed material at a column segment in a second zone; c. flowing the monohydric alcohol eluent reactant in a first direction toward the first zone to contact the acylglycerol feedstock and moving the plurality of column segments in a second direction opposite the first direction; d. removing a first effluent enriched in the fatty acid monoester from a product port positioned in the first zone downstream of the feed port position with respect to the first direction; and e. removing a second effluent enriched in glycerol from a raffinate port position in the second zone upstream of the feed port with respect to the first direction.

In yet another aspect there is provided a biodiesel fuel production facility comprising a simulated moving bed apparatus configured to operate any one of the processes provided herein. Such a facility will be characterized by having a simulated moving bed apparatus configured with ports directing a flow of monohydric alcohol and triacylglycerol feed stock simultaneously onto a catalytic chromatographic bed material, with simultaneous removal of fatty acid monoester product and glycerol in different zones of the simulated moving bed apparatus.

In a typical practice, the reaction and sorbent chromatography are performed over a catalytic chromatographic bed that contains a first catalyst, i.e., a solid phase catalyst. Typically, the catalytic chromatographic bed material is also simultaneously contacted with a second catalyst, typically a liquid catalyst, mixed with the monohydric alcohol or added separately. The catalytic chromatographic bed therefore serves two roles simultaneously, a first role as a solid phase catalyst and a second role as the stationary phase for sorbent chromatography.

In certain practices, the sorbent chromatography accomplishes a chromatographic separation using the monohydric alcohol as both the reactant and the eluent, thereby lowering materials and processing cost. By also contacting the reactants and catalytic chromatographic bed with the second catalyst, which is optional, a synergistic catalytic effect is observed that exceeds the efficiency of using the catalytic chromatographic bed or second catalyst separately or in sequential steps. In another and important aspect, the process is performed on a simulated moving bed apparatus, which can be continuously operated with a constant load of triacylglycerol feed and constant withdrawal of fatty acid monoester product and glycerol coproduct, thereby further increasing processing efficiencies.

In some embodiments, the catalytic chromatographic bed material is a basic resin where the basic moiety serves as the first catalyst, the added second catalyst is a hydroxide base such as sodium hydroxide, and the products are chromatographically separated. In other embodiments, the teachings may also be adapted for using the chromatographic bed material to accomplish adsorptive/desorptive separation procedures. Any chromatographic bed material having a basic moiety capable of catalyzing the transesterification reaction alone, or in combination with the second catalyst is suitable to serve as a catalytic chromatographic bed. Examples of suitable basic catalytic chromatographic bed materials include, but are not limited to strong base and weak base ion-exchange resins. Examples of suitable strong base (anion exchange) resins include those sold by Mitsubishi Chemical Co. (Tokyo Japan), under the product name DIAION, with product numbers PA308, PA312, PA316, PA408, PA412 and PA418; those sold by Lanxess Sybron (Birmingham, N.J.), with product number Lewatit MP600; those sold by the Rohm & Haas Company (Philadelphia, Pa.) with product numbers FPA900, IRA400, and A26; those sold by Hangzhou Zhengguang Company (Peking, China), with product numbers ZGD730 and ZGA304; those sold by Dow Chemical Co. (Midland, Mich.), with product numbers Dowex 22; those sold by the Purolite Co. (Bala Cynwyd, Pa.) with product number Purolite A510; and those sold by Finex OY, (Kotka, Finland) with product number AN-24. Examples of suitable weak base resins include those sold by Rohm & Haas Company (Philadelphia) with product numbers Amberlite IRA96RF, Amberlyst™ A21, Amberlyst™ A23, Amberlyst™ A24; those sold by Lanxess Sybron (Birmingham, N.J.) with product numbers Lewatit MonoPlus™ MP64, Lewatit MP 62, Lewatit VP OC 1072, Lewatit MonoPlus™ MP64, Lewatit MP 62 WS, Lewatit S 4268, Lewatit S 4228, Lewatit S 4328, Lewatit S 4428, Lewatit S 4528, Lewatit VP OC 1072; those sold by ResinTech, Inc. (West Berlin, N.J.) with product numbers WBG30, WBMP, WBACR; those sold by Dow Chemical Co. (Midland, Mich.), with product numbers Dowex 22; those sold by the Purolite Co. (Bala Cynwyd, Pa.) with product numbers Purolite A100, and A847; those sold by Novasep Inc. (Boothwyn, Pa.) with product numbers XA 3031, XA 3032, XA 3041, XA 3042, XA 3043, XA 3051, XA 3053, XA 3061, XA 3062, XA 3111, XA 3112, XA 3251, XA 3261; and those sold by Finex OY, (Kotka, Finland) with product number AS 553 M and those sold by Dow Chemical Co. (Midland, Mich.) with product numbers Dowex 66, Dowex MONOSPHERE 66, Dowex MONOSPHERE 77, Dowex MARATHON WBA, Dowex MARATHON WBA-2, Dowex UPCORE Mono WB-500, XUS 43594.00, Dowex M-43, and XUS 43568.00.

In some embodiments, the catalytic chromatographic bed material is an acidic resin which has been converted to the basic (alkali) form, where the basic moiety ionically bound to the acid resin serves as the first catalyst, the added second catalyst is a hydroxide base such as sodium hydroxide, and the products are chromatographically separated. Alternatively, the catalytic chromatographic bed material is a non-functional, (i.e., lacking a functional group such as cation or anion) resin or nonfunctional solid which has been converted to the basic (alkali) form, where the basic moiety associated with the nonfunctional resin serves as the first catalyst, the added second catalyst is a hydroxide base such as sodium hydroxide, and the products are chromatographically separated. In other embodiments, the teachings may also be adapted for using the chromatographic bed material to accomplish adsorptive/desorptive separation procedures. Any chromatographic bed material having an acid moiety capable of being converted to the basic (alkali) form and catalyzing the transesterification reaction alone, or in combination with the second catalyst is suitable to serve as a catalytic chromatographic bed. Examples of suitable acidic catalytic chromatographic bed materials include, but are not limited to strong acid and weak acid ion-exchange resins. Examples of suitable strong acid (cation exchange) resins include those sold by Dow Chemical Co. (Midland, Mich.) with product numbers Dowex Monosphere® 88, Dowex N406®, Dowex Marathon C (H)®, Dow XUS 43569™; those available from The Purolite Co. (Bala Cynwyd, Pa.), with product numbers Purolite MN500™, Purolite SST-60™, Purolite C100™, Purolite C100H™, Purolite C100E™, Purolite C101X10™, Purolite C145™, Purolite C147™, Purolite C150™, Purolite C150H™, Purolite C155™ Purolite C160™, Purolite C160H™, those sold by Rohm & Haas Corp. (Philadelphia, Pa.) with product numbers Amberlite 200 Na, Amberlite 1200 Na, Amberlyst 15 WET, Amberlyst 16 WET, and Amberlyst 131 WET: those sold by Mitsubishi Chemical Corp. (Tokyo, Japan) with product numbers DIAION® SK1B, DIAION® SK104, DIAION® SK110, DIAION® SK112, DIAION® SK116, DIAION® PK208, DIAION® PK212, DIAION® PK216, DIAION® PK220, DIAION® PK228, DIAION® HPK25, RAD/F®, EXCO4™; and that available from Finex Ltd., (Kotka, Finland) with product number Finex CS24. Examples of suitable weak acid (cation exchange) resins include those sold by Dow Chemical Co. (Midland, Mich.) with product numbers Dowex Mac3; those available from Mitsubishi Chemical Co. (Tokyo, Japan) with product numbers WK10, WK11, WK20, WK40, WK100 and WT01S; those available from The Purolite Co. (Bala Cynwyd, Pa.) with product numbers C106, C106EP, C104, C105, C107 and C115; and those available from Rohm & Haas (Philadelphia, Pa.) with product numbers IRP64, IRP88, IRC50, IRS50S, CS100, IRC76, C433 and C464. Examples of nonfunctional resins include that sold by Mitsubishi Chemical Corp. (Tokyo, Japan) with the product number SP70. Examples of nonfunctional solids include that sold by LaChemCo Corp, (Gramercy, La.) with the product name "Spherical Alumina" and that sold by Makall Corp. (Quindao, China) with the product name "Spherical Silica".

In still other embodiments, the teaching is adaptable for use with a wide variety of different catalytic chromatographic bed materials, including not only basic resins, but also acidic resins, acidic zeolites, bed materials containing metals, metal salts of amino acids and the like. Additionally, the methods are adaptable for use with non-catalytic chromatographic bed material where the sole catalyst is the added catalyst but where the reaction and the sorbent separation are nevertheless conducted simultaneously.

In another aspect, the method provides synthesis of a fatty acid monoester from an acylglycerol and monohydric alcohol and simultaneous separation of the fatty acid monoester from glycerol over a simulated moving bed chromatographic bed without utilizing a two stage separation involving a first fixed bed.

In another aspect, the method provides synthesis of a fatty acid monoester from an acylglycerol and monohydric alcohol and simultaneous separation of the fatty acid monoester from glycerol over a simulated moving bed chromatographic bed wherein none of the reactants or products are in a vapor phase.

In another aspect, the method provides a stream of glycerol coproduct suitable for use in a variety of applications, such as vehicular & pedestrian deicing/anti-icing applications, including a salt brine additive, rock salt treatment, magnesium chloride treatment, and glycerol-based non-chloride highway anti-icers or sand treatment; industrial & commercial applications, including freeze conditioner for particulate products such as coal and ores, fire resistant hydraulic fluids, engine coolants, oil & gas well fluids, agricultural anti-icing applications, and lavatory fluids (e.g. aircraft, recreational vehicles).

In another aspect, the methods can be used with further modification to produce a range of biobased chemical feedstocks. In one embodiment, the coproduct glycerol can be subjected to hydrogenolysis to yield a mixture containing one or more valuable feedstocks such as, propylene glycol, ethylene glycol, methanol, 2-propanol, glycerol, lactic acid, glyceric acid, sodium lactate, and sodium glycerate. These in turn can be further reacted to form valuable products; for example, ethylene glycol and propylene glycol can be used in latex paint or as feedstocks for the industrial synthesis of polyester polymers, such as, for example, unsaturated polyethylene terephthalate, and other polyester resins. In another embodiment, the glycerol coproduct can be used as a feedstock for synthesis of epichlorohydrin. In another embodiment, the glycerol coproduct can be used as a feedstock for synthesis of acrolein, which in turn can be converted into allyl alcohol, 1,3 propanediol, and acrylic acid; the latter can be combined with fusel oil alcohols and ethanol from fermentation to synthesize acrylic esters. In these embodiments, the glycerol coproduct of the present disclosure provides the advantage of low contents of chloride.

BRIEF DESCRIPTION OF THE DRAWINGS

FIG. 2 diagrammatically illustrates another embodiment of a simulated moving bed chromatographic apparatus for simultaneously synthesizing fatty acid monoesters from acylglycerols and purifying them from coproducts, configured with a basic catalytic chromatographic bed material. FIG. 2a illustrates the position of ports at a first time and FIG. 2b illustrates the position of the ports at a second, step time.

FIG. 3 illustrates an embodiment of a simulated moving bed apparatus configured for simultaneously synthesizing and purifying a fatty acid monoester and purifying it from coproducts with an acidic catalytic chromatographic bed in which the acidic catalyst has been converted to the basic form by treatment with an alkali solution.

DETAILED DESCRIPTION OF PREFERRED EMBODIMENTS

Figure 1:
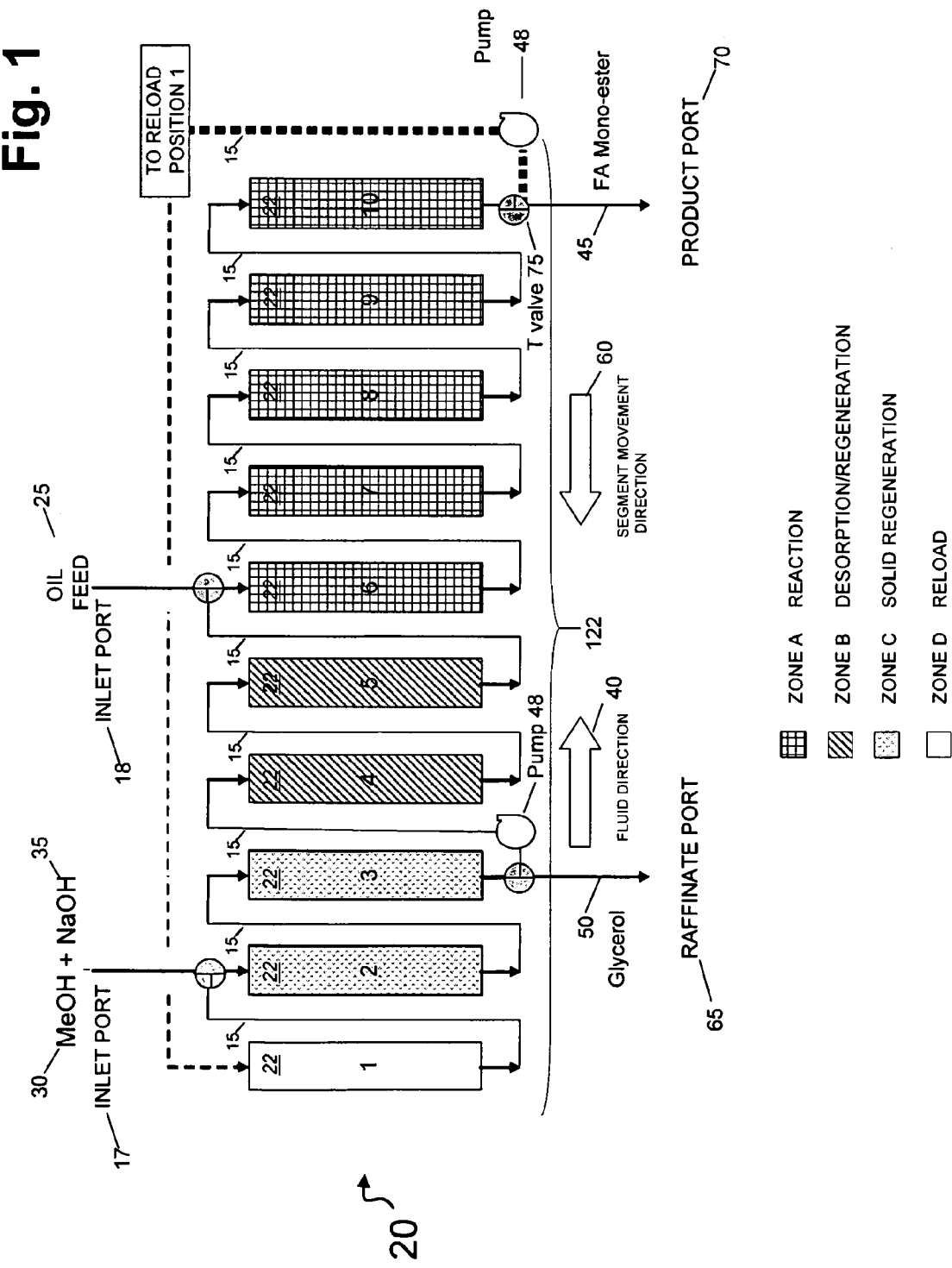
FIG. 1 diagrammatically illustrates one embodiment of a simulated moving bed chromatographic apparatus configured with a basic catalytic chromatographic bed material (strong base resin) and its use in a process for synthesizing fatty acid monoesters and glycerol coproduct and simultaneously purifying fatty acid monoesters and glycerol coproduct by chromatographic separation.

Prior to describing the present invention in detail, certain terms that have meanings generally understood by those of ordinary skill in the art are nevertheless defined herein to better distinguish nuances in meaning that may apply to different embodiments of the invention. It is understood that the definitions provided herein are intended to encompass the ordinary meaning understood in the art without limitation, unless such a meaning would be incompatible with the definitions provided herein, in which case the provided definitions control.

"Chromatographic Separation" and variations thereof refers to rate-based separation of chemical species over a stationary solid phase chromatographic sorbent material by differential partitioning of the species between the stationary phase and a mobile eluent phase. By "rate based separation" it is meant that a portion of each species is always moving with the mobile phase eluent but that a difference in partitioning rates between species results in a different rate of movement of species over the stationary phase thereby accomplishing a separation dependent on time and bed volume. Accordingly, chromatographic separation can be accomplished by the use of single mobile phase without a requirement to change eluent conditions. In this regard, chromatographic separation may be characterized as a "continuous separation process" because the species being separated are in continuous motion.

"Adsorptive/Desorptive Separation" or "Adsorptive/Desorptive Chromatography" and variations thereof are specifically meant to distinguish from chromatographic separation, and refers to a process where chemical species are separated by immobilizing one species on a solid phase sorbent while moving another species preferentially with the eluent under a first eluent condition, then changing eluent conditions to a second condition where the immobilized species is desorbed from the sorbent to preferentially partition with the eluent. Accordingly, the two features that fundamentally distinguish chromatographic separation from adsorptive/desorptive separation are that in the latter case (i) a first eluent condition is selected to accomplish, as near as possible, complete immobilization of at least one species on the chromatographic material, and (ii) there is a change to a second eluent condition selected to cause the immobilized species to become mobile. In this regard, adsorptive/desorptive separation may be characterized as a "discontinuous" or "stepwise" separation process.

The ordinarily skilled person will recognize that depending on eluent selection and chemical species, the same solid phase chromatographic material may be used to accomplish chromatographic separation, adsorptive/desorptive separation, or both. For example, in a first step to separate a mixture containing species A, B and C, an ion exchange material may be employed as a sorbent stationary phase in conjunction with an eluent at a first pH selected to cause species A and B to be immobilized on the sorbent while species C preferentially partitions with the mobile eluent phase thereby accomplishing adsorptive/desorptive separation of species A and B from species C. In a second step, the eluent conditions can be changed to a second pH that causes species A and B to preferentially partition with the moving phase. If the change in pH also causes species A and B to differentially partition between the mobile phase and the stationary phase, then species A and B will move at different rates over the stationary phase and be chromatographically separated on the same ion exchange material.

"Sorbent Separation" or "Sorbent Chromatography" and grammatical variations thereof, refer generally to the separation of chemical species using a solid phase sorbent material and at least one mobile phase eluent. These terms encompass both chromatographic separation and adsorptive/desorptive separation.

"Chromatographic Bed Material" "Chromatographic Sorbent" or "Stationary Phase," refer to a solid phase sorbent material used to separate chemical species by sorbent separation.

"Acylglycerol" refers to an ester of glycerol, such as a triacylglycerol, diacylglycerol, or monoacylglycerol and fractions or combinations thereof. This term includes oil and fat, such as vegetable oil, vegetable fat, animal oil, animal fat, and fractions or combinations thereof.

"ME" is an abbreviation for a general methyl ester, "FAME" is an abbreviation specifically for a fatty acid methyl ester. "TAG" is an abbreviation for a triacylglycerol.

"Catalytic Chromatographic Bed Material" refers to a chromatographic bed material containing a functional group that acts as a catalyst for a chemical reaction and where the bed material also functions as a solid phase sorbent to separate species that are reactants and/or products of the catalyzed reaction by sorbent chromatography. A catalytic chromatographic bed may be a homogenous bed material that performs both functions, or a mixture of materials where one material provides the solid phase catalyst and the other functions as the solid phase sorbent. It will be appreciated that the same chromatographic material may function as a catalytic chromatographic material in one case and simply as a sorbent material in another case, depending upon whether or not the species loaded on to the chromatographic material undergo a chemical reaction catalyzed by the material.

"Eluent" refers to a mobile phase of fluid passed over a chromatographic bed material to accomplish sorbent separation.

"Eluent Reactant" refers to a mobile phase containing a species that acts both as a reactant for a chemical reaction and an eluent for either adsorptive/desorptive separation or chromatographic separation of chemical species. If eluent reactant is chemically converted to a product while serving as an eluent, the product will also be the eluent.

"Raffinate" is a general term that refers to the liquid effluent or fraction resulting from a separation procedure and that does not contain the desired product.

"Continuously Operating" or "Continuously Separating" in reference to use of a sorbent chromatographic separation process means that the process is conducted indefinitely over time with an uninterrupted input of reactants and/or eluent(s), with an uninterrupted withdrawal of product and/or raffinate, and if elected, with an uninterrupted flow of bed preparation material. In this regard, both adsorptive/desorptive separation and chromatographic separation can be continuously operated, with the difference being that in adsorptive/desorptive separation there is some section of the chromatographic bed subject to disconnection from the series so that it can be treated with a discrete discontinuous change in eluent conditions.

"Simultaneously continuously contacting" means that one or more segments of a fluidly interconnected chromatographic bed are contacted with at least two different substances at the same time so that the flow of one substance through the interconnected segments is continuous with the flow of another substances, which together contribute to the whole flow of substances over the interconnected portion of the bed. The term is meant to contrast with "stepwise contacting" where one or more segments are contacted with the different substances at different points in time whether portions of the bed are fluidly interconnected or not. The term is also intended to distinguish from "simultaneous discontinuous contacting," which is a situation where certain segments of chromatographic bed are not connected to one another (or are disconnected) so that even though different segments of the bed might be contacted with different substances at the same moment in time, the total flow of substances over the whole of the bed is not affected by the flow of substances in disconnected portions. This later situation is encountered when conducting continuous separation using adsorptive/desorptive chromatography.

"Synergistic Catalysis" and grammatical variations thereof, means that the efficiency (amount of product produced per amount of reactant input) of catalytic conversion of reactants to products using two or more catalysts is greater than the expected efficiency resulting from the sum of using the two or more catalyst together. For example, under ordinary circumstances, if catalysts C1 causes 80% conversion of reactant A to product B in a first catalytic reaction, and catalyst C2 causes 50% conversion of reactant A to product B in a second catalytic reaction, the expected net efficiency of conversion of using both catalyst simultaneously or sequentially is only 90%, which is the sum of 80% from the operation of catalyst C1 on 100% of reactant A, and 50% from the operation of catalyst C2 on the remaining 20% of reactant A (the unconverted portion from the first reaction). By contrast, in synergistic catalysis, greater than 90% of conversion would be accomplished using C1 and C2 together.

Turning now to the invention, the disclosure that follows is based on the discovery that alcoholytic transesterification of oils rich in acylglycerols, typically triacylglycerols, with a primary (monohydric) alcohol to form a fatty acid monoester compound useful as a biodiesel fuel can be efficiently accomplished by simultaneously performing the transesterification reaction while performing sorbent chromatography to separate the reaction products, i.e., a fraction enriched in the fatty acid monoester from a fraction enriched in glycerol.

Biodiesel fuels made according to the present methods are fatty acid monoesters prepared from oil feedstocks comprising oils, fats and waxes (collectively known as lipids), a majority of which are triacylglycerol molecules. The term "oil feedstock" is accordingly intended to encompass a lipid material of biological origin where the majority of the lipids are acylglycerols. Different oil feedstocks typically contain predominant types of particular fatty acid alkyl chains linked to glycerol that are characteristic of the oil obtained from particular sources. Suitable lipids include wood oils such as tung oils; animal-derived oils, such as tallow, lard, poultry grease, or lanolin; and vegetable oils. The principle oils used for biodiesel production are vegetable oils obtained from oilseed plants. Example vegetable oils include, but are not limited to, soybean oil, linseed oil, sunflower oil, castor oil, corn oil, canola oil, rapeseed oil, palm kernel oil, cottonseed oil, peanut oil, coconut oil, palm oil, tung oil, safflower oil and derivatives, including without limitation, conjugated derivatives, genetically-modified derivatives and mixtures thereof. Vegetable oils typically also include a small portion of ester derivatives of triacylglycerol, including for example: some naturally occurring fatty acid alkyl monoesters,; monoacylglycerols, and diacylglycerols. Oil feedstocks may also contain a portion of free fatty acids. The acylglycerols useful in the present methods include those formed by hydrogenation, deodorization, heat-treatment, or blowing of polyunsaturated oils or fatty acids are also suitable feedstocks.

Example acylglycerols esters include, but are not limited to, esters of saturated fatty acids, including but not limited to lauric acid, myristic acid, palmitic acid, stearic acid, or arachidic acid; esters of monounsaturated acids, including, but not limited to palmitoleic acid, oleic acid, erucic acid, or elaidic acid; and esters of polyunsaturated fatty acids, including but not limited to linoleic acid, linolenic acid, eleostearic acid, ricinoleic acid, arachidonic acid, cetoleic acid, eicosapentaenoic acid, or docosahexaenoic acid. Esters of polyunsaturated fatty acids may contain 2, 3, 4, 5, 6 or more double bonds in the acyl moiety of the carbon chain.

One aspect of the methods provided herein is use of a simulated moving bed chromatographic apparatus containing a catalytic chromatographic bed material to simultaneously provide for catalysis of the transesterification reaction and to separate the glycerol and fatty acid monoester products made thereby.

Simulated moving bed chromatographic apparatus containing ion exchange chromatographic bed materials have been used in the separation of hydrophilic products such as basic amino acids and acidic carboxylic acids from fermentation broths using polar ion exchange chromatographic bed materials. In these processes, the simulated moving bed apparatus is configured to perform the separation by absorptive/desorptive chromatography, which requires a discontinuity in connections to switch from a first eluent condition where the desired product is bound to the chromatographic bed and then to a second condition where the desired product desorbed from the bed. Although these are discontinuous separation techniques, simulated moving bed apparatus are typically mounted on a carousel, so that by appropriate use of valves and eluent streams at different stations, the process can be operated in a continuous manner.

While adsorptive/desorptive separation may be used in certain embodiments provided herein, more advantageous embodiments employ true simulated moving bed chromatographic separation. True simulated moving bed chromatographic separation, is a continuous chromatographic separation technique that uses the simulated moving bed apparatus to mimic the effect that would be observed if a fluid phase material containing species to be separated could be made stationary while a solid phase chromatographic material moved through the fluid phase. The effect would be to separate the species into different zones within the bed material based on their relative partitioning rates between the fluid phase and the bed material. This effect is mimicked by dividing the chromatographic bed material into fluidly interconnected sections and moving the interconnected sections in a counter current direction opposite to the direction of flow of feed material (and eluent if different from the feed material). The species that preferentially partition with the mobile fluid phase will thus preferentially move in one direction, while the species that preferentially partition with the solid phase will move in the opposite direction thus effecting a separation into different column segments representing the different zones.

When true simulated moving bed chromatography is operated in a continuous manner as provided in certain embodiments, with stepwise segment movement, input of feed and withdrawal of product from the different zones, a standing concentration gradient is established between the ends of the withdrawal zones, with one end being preferentially enriched with one species and the opposing end being preferentially enriched with the other species. When there is complete withdrawal of products from the different zones, or when an optional regeneration zone is used to wash or replenish a segment with an input eluent, the process can be run indefinitely to provide continuous separation and isolation of the desired species from a feedstock without need for intervention.

In any simulated moving bed chromatographic apparatus the chromatographic bed material contained in the apparatus is conceptually divided into zones, where each zone may be distinguished from the other zones by the fluid flow in the chromatographic bed material in that zone. Zones may also be distinguished, for example, by the effluent introduced or withdrawn in the zone or the dominant function that occurs within the zone. In certain embodiments where different fluids are applied in different zones, a gradient is established with increasing content of a first fluid and decreasing content of the second fluid and vice a versa in the opposite direction with respect to the position of the input zones.

In the typical simulated moving bed apparatus, the plurality of interconnected chromatographic bed segments are arranged in a sequential series and fluid ports are provided so that a feedstock, eluent or other mobile phase material may be introduced to, or withdrawn from, any selected segment or position in the apparatus. An arrangement of valves at the top and bottom of each segment directs the flow of fluids into and out of any number of interconnected segments in the same or different zones at flow rates that can be independently controlled. The column segments are typically arranged on a carousel type configuration that cycles the column segments in a circular movement of positions in discrete steps over the course of the cycle. In this construction, the ports in contact with the column segments at the top and bottom of each segment are stationary, so that the column segments cycle in a circular movement with respect to the stationary port. In a complete cycle, each column segment passes through each different position and set of stationary ports where different predominant functions are occurring. The function occurring at any given position remains constant and therefore the position of the segment conceptually designates its zone. In an alternative carousel construction, the column segments are stationary and the ports in contact with the column segments at the top and bottom of each column segment cycle in a circular movement with respect to the column segments. In a complete cycle, the movement of the ports causes each column segment to pass through each different position where different predominant functions are occurring. The function occurring at any given position remains constant and therefore the position of the segment conceptually designates its zone.

In the present methods, the simulated moving bed chromatography apparatus comprises at least (i) a reaction zone where the monohydric alcohol and oil feedstock contact one another to form the fatty acid monoester, which is withdrawn as an enriched fraction from a product port in the reaction zone, and (ii) a desorption/regeneration zone where a fraction enriched in the unwanted raffinate product (e.g., glycerol) is removed from the apparatus. In a typical embodiment a third zone designated a solid regeneration zone is used to introduce the monohydric alcohol into the apparatus displacing residual materials. A more typical embodiment utilizes a fourth zone where optionally the column segment is prepared for reloading. In other embodiments, one or more of the described zones can be replaced or eliminated. In yet other embodiments, one or more zone can be duplicated and operated sequentially with the other zones. In yet other embodiments, one or more zones can be duplicated and operated in parallel with the other zones.

The number of chromatographic beds, columns or parts thereof connected in the series is unlimited. The present methods can be optimized by adjusting flow rates for input and withdrawal of fluids and the timing of segment (or port) movement to improve product yield. Another variable for optimizing the present method is the number of chromatographic segments used to define a zone in the series. Within the series, each zone can have an optimized number of column segments. Thus, while the Figures provided herein each depict an exemplary configuration with 10 column segments for ease of description, the methods provided herein are not limited to a certain number of chromatographic devices. Within the series of chromatographic devices, there are one or more segments defining the zones described above. Each zone contains an independent number of chromatographic devices. The method is therefore scalable to any practical dimension by one of ordinary skill in the art. One of the parameters is the unlimited number of chromatographic segments in a series and the number within each zone in the series.

FIG. 1 illustrates an exemplary system for the practice of the methods provided herein. FIG. 1 depicts a simulated moving bed chromatographic apparatus 20 comprising a plurality of column segments 1-10 connected in sequential fluid series via fluid conduits 15 to form a continuous chromatographic bed 122 with each of the column segments 1-10 containing a catalytic chromatographic bed material 22. In the embodiment depicted in FIG. 1, the catalytic chromatographic bed material 22 is comprised of a basic solid phase catalyst. The catalytic chromatographic bed 122 is simultaneously and continuously contacted with: (i) an oil feedstock 25 comprising acylglycerol within a first zone of the catalytic chromatographic bed 122 at column segment 6; and (ii) with a monohydric alcohol eluent reactant 30 within a second zone at column segment 2. Optionally, in an advantageous practice, a second catalyst 35 is also simultaneously contacted with the catalytic chromatographic bed 122 along with the monohydric alcohol 30. In the depicted embodiment, the second catalyst is also a basic catalyst, exemplified with sodium hydroxide. The reactants are introduced into the catalytic chromatographic bed 122 via inlet ports, 17 and 18. The flow of these materials together establishes a moving phase of eluent reactants to be separated by sorbent chromatography.

The monohydric alcohol 30 from the second zone (zone C, solid regeneration zone) is pumped in a first direction 40 toward the first zone to contact the oil feedstock 25, which is also pumped through the simulated moving bed apparatus in the first fluid direction 40. In a typical practice, the flow rate of the monohydric alcohol 30 and optional catalyst 35 is higher than the flow rate of the oil feed stock 25 so that the flow of the monohydric alcohol 30 overtakes the flow of the oil feedstock 25 and these reactants 25, 30 will contact one another over the catalytic chromatographic bed 122. When the monohydric alcohol 30 with optional second catalyst 35 contacts the oil feedstock 25 containing the acylglycerol over the catalytic chromatographic bed 122 transesterification occurs thereby forming the fatty acid monoester 45 and glycerol 50 products. As depicted in FIG. 1, this contact occurs between segments 6 and 10 in the first zone of the catalytic chromatographic bed 122, which is therefore designated as the reaction zone (zone A).

When the catalytic chromatographic bed material 22 comprises polar moieties on the solid phase as in the case where the catalytic chromatographic bed 122 has a basic catalyst moiety, the non-polar fatty acid monoester 45 preferentially partitions with the moving phase and therefore continues to move in the first flow direction 40. On the other hand, the more polar glycerol 50 product preferentially partitions with the solid phase catalytic chromatographic bed material 22 by sorbent interaction. At discrete points in time the column segments 1-10 are simultaneously moved one step in a second direction 60, which is opposite (counter-current) to the first direction 40 of mobile phase flow. Because the glycerol preferentially partitions with the catalytic chromatographic bed material 22, repeated periodic movement of the column segments 1-10 causes the glycerol 50 to preferentially move over the catalytic chromatographic bed 122 in the second direction 60 toward a raffinate removal port 65 shown in column segment 3 where glycerol 50 is removed from the catalytic chromatographic bed 122. Because the glycerol 50 is removed (desorbed) from the catalytic chromatographic bed 122 at the raffinate port 65, the column segments 4-5 between the raffinate port 65 and oil feed inlet port 18 are designated separation desorption/regeneration zone B. While the glycerol 50 moves with the resin 22 in the second direction 60, the fatty acid monoester 45 continues to move with the mobile phase in the first direction 40 where it is removed from a product port 70 shown in column segment 10.

In a typical arrangement, the column segments 1-10 are sequentially interconnected in a circular fashion on a carousel so that column segment 1 is immediately adjacent to column segment 10 on the carousel. The aforementioned second zone where the monohydric alcohol 30 is introduced into the catalytic chromatographic bed 122 re-generates the monohydric alcohol 30 content of catalytic chromatographic bed 122 and provides eluent flow for withdrawal of the glycerol 50 from raffinate port 65. Accordingly, column segments 2 and 3 between the inlet port 17 and raffinate port 65 are designated as desorption/regeneration Zone C. In an optional step a reload zone (zone D) may be employed (depicted as column segment 1 in FIG. 1). A "T" valve 75 positioned at the bottom of column segment 10 allows a first part of the product stream to be eluted from the catalytic chromatography bed through a first port of the valve. A pump 48 in contact with a second port of the valve may be used to pump a volume of a second part of the product into a reload zone (zone D), displacing monohydric alcohol, glycerol, and second catalyst from the column segment in the reload zone. Thus, when the column segment moves from the reload zone to the reaction zone (zone A), the fluid stream is enriched in product and depleted of monohydric alcohol, glycerol, and second catalyst. Sufficient volume is pumped by pump 48 from column 10 of zone A to the reload column of Zone D to prepare the column segment in the reload zone for subsequent movement into the reaction zone.

The process can be operated with simultaneous and continuous introduction of the monohydric alcohol 30, optional second catalyst 35 and oil feedstock 25, along with simultaneous and continuous withdrawal of the glycerol 50 and fatty acid monoester 45 from the respective raffinate 65 and product 70 ports. The net effect of this operation is to form a standing, but continuously flowing concentration gradient across the chromatographic bed material 22 between the raffinate port 65 and the product port 70 with the effluent from the raffinate port being enriched in glycerol 50 and the effluent from the product port 70 being enriched with the fatty acid monoester 45.

The identical effect can be accomplished in alternative construction of the simulated moving bed apparatus depicted in FIG. 2. In this alternative embodiment, instead of moving the column segments 1-10 in a step-wise fashion countercurrent to the flow of the first flow direction 40 of the mobile phase, at periodic points in time each of the fluid conduits 15, input ports 17, 18 and effluent ports 65, 70 are simultaneously moved one step the same direction 40. This simulates movement of catalytic chromatographic bed material in the opposite direction. In this embodiment movement of the fluid conduits 15, input ports 17, 18 and effluent ports 65, 70 cause different column segments to be contacted with input material or unloaded as product or raffinate material at different sequential points in time. The stepwise movement is depicted in FIGS. 2a and 2b. In FIG. 2a the monohydric alcohol 30 and optional second catalyst 35 are initially introduced at column segment 1, the glycerol 50 raffinate is being withdrawn at column segment 2, the oil feedstock 25 is being introduced at column segment 5 and the fatty acid monoester 45 product is being withdrawn at column segment 9. In the next step depicted in FIG. 2b, the fluid conduits 15, input ports 17, 18 and effluent ports 65, 70 are simultaneously moved one step in port movement direction 61 in the same direction 40 the mobile phase is flowing so that the monohydric alcohol 30 and optional second catalyst 35 are being introduced at column segment 2, the glycerol 50 raffinate is being withdrawn at column segment 3, the oil feedstock 25 is being introduced at column segment 6 and the fatty acid monoester 45 product is being withdrawn at column segment 10. In this embodiment, rather than the concentration gradient being a standing gradient between columns segments 1-10, the gradient moves between segments, however, there remains a standing gradient between the raffinate port 65 and product port 70.

One of the advantageous cost effective features of the methods provided herein is that several components perform dual or multiple functions. The optional second basic catalyst 35 not only provides a catalytic function for the conversion of the monohydric alcohol 30 and acylglycerol of the oil feedstock 25 into the fatty acid monoester 45, but it also functions to maintain the strong basic bed material in the basic state. The monohydric alcohol 30 not only functions as a reactant for the formation of the fatty acid monoester 45 and glycerol 50, but also functions as the mobile phase eluent to effect the chromatographic separation of glycerol 50 from the fatty acid monoester 45. Further, the catalytic chromatographic bed material 22 not only functions to catalyze the formation of the fatty acid monoester 45 and glycerol 50 products, but also functions as a sorbent bed for sorbent separation of the product species. Moreover, the monohydric alcohol 30 also serves as a regenerant and glycerol desorbent for the catalytic chromatographic bed 122.

Another advantage of the present methods is production of fatty acid monoesters from acylglycerol and monohydric alcohol feedstocks to provide at least 90% conversion of the fatty acids moieties of the acylglycerol into the fatty acid monoester and glycerol. More typical embodiments provide at least 95% conversion, and certain exemplary embodiments provide at least 98% conversion and at least 99% conversion.

The exemplary embodiments depicted in FIGS. 1 and 2 use a basic resin to provide the first catalyst on the catalytic chromatographic bed and an optional second dissolved or suspended catalyst, which is also a basic catalyst. Suitable basic resins useful for this aspect of the teaching include, but are not limited to those sold by Mitsubishi Chemical Co. (Tokyo Japan), under the product name DIAION, with product numbers PA308, PA312, PA316, PA408, PA412 and PA418; those sold by Lanxess Sybron (Birmingham, N.J.), with product number Lewatit MP600; those sold by the Rohm & Haas Company (Philadelphia, Pa.) with product numbers FPA900, IRA 400, and A26; those sold by Hangzhou Zhengguang Company (Peking, China), with product numbers ZGD730 and ZGA304; those sold by Dow Chemical Co. (Midland, Mich.), with product numbers Dowex 22; those sold by the Purolite Co. (Bala Cynwyd, Pa.) with product number Purolite A510; and those sold by Finex OY, (Kotka, Finland) with product number AN-24. Examples of suitable weak base resins include those sold by Rohm & Haas Company (Philadelphia) with product numbers Amberlite IRA96RF, Amberlyst™ A21, Amberlyst™ A23, Amberlyst™ A24; those sold by Lanxess Sybron (Birmingham, N.J.) with product numbers Lewatit MonoPlus™ MP64, Lewatit MP 62, Lewatit VP OC 1072, Lewatit MonoPlus™ MP64, Lewatit MP 62 WS, Lewatit S 4268, Lewatit S 4228, Lewatit S 4328, Lewatit S 4428, Lewatit S 4528, Lewatit VP OC 1072; those sold by ResinTech, Inc. (West Berlin, N.J.) with product numbers WBG30, WBMP, WBACR; those sold by Dow Chemical Co. (Midland, Mich.), with product numbers Dowex 22; those sold by the Purolite Co. (Bala Cynwyd, Pa.) with product numbers Purolite A100, and A847; those sold by Novasep Inc. (Boothwyn, Pa.) with product numbers XA 3031, XA 3032, XA 3041, XA 3042, XA 3043, XA 3051, XA 3053, XA 3061, XA 3062, XA 3111, XA 3112, XA 3251, XA 3261; and those sold by Finex OY, (Kotka, Finland) with product number AS 553 M and those sold by Dow Chemical Co. (Midland, Mich.) with product numbers Dowex 66, Dowex MONOSPHERE 66, Dowex MONOSPHERE 77, Dowex MARATHON WBA, Dowex MARATHON WBA-2, Dowex UPCORE Mono WB-500, XUS 43594.00, Dowex M-43, and XUS 43568.00.

In addition to basic resins, acidic and nonfunctional resins and nonfunctional solids can be used if they are converted to the basic form by treatment with alkali. Suitable acid catalysts include strong acid and weak acid ion-exchange resins. Examples of suitable strong acid (cation exchange) resins include those sold by Dow Chemical Co. (Midland, Mich.) with product numbers Dowex Monosphere® 88, Dowex N406®, Dowex Marathon C (H)®, Dow XUS 43569™; those available from The Purolite Co. (Bala Cynwyd, Pa.), with product numbers Purolite MN500™, Purolite SST-60™, Purolite C100™, Purolite C100H™, Purolite C100E™, Purolite C100X10™, Purolite C145™, Purolite C147™, Purolite C150™, Purolite C150H™, Purolite C155™ Purolite C160™, Purolite C160H™, those sold by Rohm & Haas Corp. (Philadelphia, Pa.) with product numbers Amberlite 200 Na, Amberlite 1200 Na, Amberlyst 15 WET, Amberlyst 16 WET, and Amberlyst 131 WET: those sold by Mitsubishi Chemical Corp. (Tokyo, Japan) with product numbers DIAION® SK1B, DIAION® SK104, DIAION® SK110, DIAION® SK112, DIAION® SK116, DIAION® PK208, DIAION® PK212, DIAION® PK216, DIAION® PK220, DIAION® PK228, DIAION® HPK25, RAD/F®, EXCO4™; and that available from Finex Ltd., (Kotka, Finland) with product number Finex CS24. Examples of suitable weak acid (cation exchange) resins include those sold by Dow Chemical Co. (Midland, Mich.) with product numbers Dowex Mac3; those available from Mitsubishi Chemical Co. (Tokyo, Japan) with product numbers WK10, WK11, WK20, WK40, WK100 and WT01S; those available from The Purolite Co. (Bala Cynwyd, Pa.) with product numbers C106, C106EP, C104, C105, C107 and C115; and those available from Rohm & Haas (Philadelphia, Pa.) with product numbers IRP64, IRP88, IRC50, IRS50S, CS100, IRC76, C433 and C464. Examples of nonfunctional resins include that sold by Mitsubishi Chemical Corp. (Tokyo, Japan) with the product number SP70. Examples of nonfunctional solids include that sold by LaChemCo Corp, (Gramercy, La.) with the product name "Spherical Alumina" and that sold by Makall Corp. (Quindao, China) with the product name "Spherical Silica".

Suitable second dissolved or suspended catalysts include, but are not limited to alkaline and/or alkaline earth hydroxides and mixtures thereof. In various embodiments the alkaline earth hydroxide catalyst is sodium and/or potassium hydroxide, sodium alkoxides, such as sodium methoxide, potassium alkoxides, such as potassium methoxide.

One advantage of the present teaching is provision of methods that allow the use of much less second catalyst than in other systems. In typical practices of the prior art using a caustic dissolved or suspended catalyst for alcoholic transesterification the amount of hydroxide is about 0.75% to 5% wt/wt relative to the amount of monohydric alcohol used. In the present methods, the amount of required catalyst can be as low as 0.05% wt/wt. In typical embodiments, the amount is between 0.05 and 0.5% wt/wt. In one exemplary embodiment the amount is about 0.1% wt/wt. The use of less alkaline second catalyst reduces the formation of undesirable saponified salts with any free fatty acids present in the acylglycerol feedstock.

While not being bound by theory, it is believed that synergistic catalysis occurs using the catalytic chromatographic bed material in combination with a dissolved or suspended catalyst because the continuous removal of a portion of the glycerol and fatty acid monoester reaction products from the chromatographic bed drives the equilibrium toward product formation. While this is advantageous, the present teaching can also be adapted for use with the dissolved or suspended catalyst alone, without the catalytic chromatographic bed. In such embodiments, the reaction may still be driven to near completion by the simultaneous separation of the fatty acid monoester and glycerol products from the reaction zone.

Other catalysts that may be used with the methods provided herein have been described for alcoholytic transesterification of acylglycerols, including without limitation, liquid bases, metals, metallic salts of amino acids, and enzymes. In addition, certain solid state substrates that contain metals, metallic salts of amino acids, or acidic functional groups have been described for biodiesel production by transesterification.

For example U.S. Pat. No. 5,525,126 describes barium or calcium acetate catalyst for biodiesel production by transesterification.

U.S. Pat. No. 6,359,157 teaches for use of metal salts of amino acids as a catalyst for biodiesel production and mentions that metal salts of amino acids are insoluble in the reactants.

U.S. Pat. No 6,376,701 describes sulfated mixed metal oxides of the formula $M_xN_{1-x}O_2$ where M is one of the group IIIB metals and N may be either Zr Ti or Sn for use as a solid catalyst for transesterification and describes use of solid materials such as zirconia, sulfated tin oxide, titania, sulfated iron oxide, acidic clays, acidic zeolites or other solid material with acidic functional groups for production of biodiesel fuels by transesterification.

U.S. Pat. No. 5,508,457 teaches use of catalyst comprising at least one silicate of the Group IVB elements of the Periodic Table for production of biodiesel fuel by transesterification.

U.S. Pat. No. 5,703,272 discloses a process for preparing a carboxylic acid ester which includes subjecting a carboxylic acid and an alcohol or a phenol to an esterification reaction in the presence of a silica-titania catalyst.

U.S. Pat. No. 6,586,609 teaches a process for the esterification of organic acids with alcohols in a reactor of the chromatographic type using a heterogeneous solid phase capable of acting both as an esterification catalyst and as a means exhibiting preferential adsorption by introduction of second compound, generally the anhydride of the acid used in the esterification reaction, which, by chemical reaction, completes the removal of the adsorbed water.

U.S. Pat. No. 6,407,269 describes metal phosphate catalyst alone or immobilized on a solid phase matrix for catalyzing transesterification reactions.

US Pat. Pub No. 2003/0229238 describes metallic compounds embedded upon the inner surfaces of the plug-flow reactor as a catalyst alone or in combination with a caustic material, where the metallic compound is can be any of a wide variety of compounds such as tin, lead, mercury, cadmium, zinc, titanium, zirconium, hafnium, boron, aluminum, phosphorus, arsenic, antimony, bismuth, calcium, magnesium, strontium, potassium, sodium, lithium, uranium and combinations thereof.

U.S. Pat. No. 6,398,707 describes a technique for enhancing the activity of an immobilized lipase. The immobilized lipase is useful in a method of preparing biodiesel by transesterification of triglycerides and a lower alcohol.

The methods provided herein may be readily adapted to any of the foregoing or other the methods of the prior art that use a solid catalyst, whenever the solid catalyst material can be combined with or immobilized on a solid phase sorbent that will differentially partition glycerol from the fatty acid monoester products in a sorbent chromatographic separation technique. Accordingly each of the publications cited herein (including within the Background Section) are incorporated herein by reference to the extent necessary to enable one of ordinary skill in the art to adapt the methods provided herein to the methods disclosed in those references.

In the embodiments using a basic catalyst as the catalytic chromatographic bed material, the underlying mechanism of differentially partitioning glycerol from the fatty acid monoesters over the chromatographic bed is a difference in degree of polarity between the two species. Glycerol is more polar than the fatty acid monoesters and therefore preferentially will partition with any solid sorbent phase that has a polar (e.g., ionic) character in the presence of the reactions used for and products of alcoholytic transesterification.

Accordingly the methods provided herein may be accomplished with catalytic chromatographic bed materials that include other polar bed materials 132, including without limitation, those that contain metals, metal salts of amino acids, silica, titania, zeolites or solid acid catalysts in lieu of the basic catalyst bed material exemplified in the present disclosure. The optional second catalyst to add can be of the same type, or different type as the catalyst on the catalytic chromatographic bed. For example, in one embodiment, if the catalytic chromatographic bed material included is an acidic catalyst which has been converted to the basic form, the added optional catalyst can also be basic as depicted in FIG. 3. The apparatus in FIG. 3 was configured essentially as the apparatus in FIG. 1 except where denoted otherwise. Alternatively, if the catalytic chromatographic bed material includes an amino acid catalyst, the optional second catalyst can be a metal or metal salt.

In embodiments where the catalytic chromatographic bed material is an acidic zeolite a further benefit is provided in that the use of the zeolite as the sorbent for chromatographic separation also facilitates dehydration of the product. Oil feedstocks from plant origin are known to contain a small percentage of free fatty acids as well as the triacylglycerols. When combined with the monohydric alcohol in the presence of the catalyst, a fatty acid monoester will be formed from the free fatty acid with the liberation of water rather than glycerol. It is known in the art that zeolites can used for the dehydration of ethanol by molecular exclusion separation because the water is included in the zeolite matrix while the larger molecules are excluded, thus water will preferentially partition with the resin. Glycerol will also preferentially partition with the resin because acidic zeolites are a polar substrate. Thus, the polar nature of the zeolite coupled with ability to include water make such a material good choice for simultaneous catalytic conversion and separation of the fatty acid monoester according to the present teaching.

In a different context, the present teaching can be used in embodiments using an immobilized enzyme such as a lipase as the catalytic chromatographic bed. Such enzymes can be immobilized on a chromatographic bed having polar functional groups so that the bed may serve both as the catalyst and sorbent phase for separation. Alternatively, the lipase bed material may be mixed with a polar chromatographic bed material to provide for the dual functionality.

In a different aspect, the present teaching may also be adapted for use with a non-catalytic chromatographic bed material configured in a simulated moving bed apparatus. In such embodiments, the only catalyst used is that which is added to the chromatographic bed simultaneously with the triacylglycerol and the alkanol. For example, with base catalysis the added dissolved or suspended hydroxide compound would be the first and only catalyst used for conversion of the triacylglycerol and alkanol into the fatty acid monoester. In these embodiments, the reactants and catalyst are still added to the chromatographic bed in the simulated moving bed apparatus as otherwise depicted in the Figures provided herein.

In one embodiment of this aspect, any hydrophilic chromatographic bed material could be used to accomplish the separation of glycerol from the fatty acid monoesters while only the first catalyst functions to simultaneously catalyze the reaction. Non limiting examples of suitable hydrophilic chromatographic bed materials include cation exchange materials, polyol resins, silica, silica gels, alumina and the like. In these embodiments, the separation would operate substantially as depicted in FIG. 1, except that the NaOH 35 would be omitted. The glycerol preferentially moves with the bed material and the fatty acid monoester preferentially moves in the opposite direction with the eluent.

In another embodiment of this aspect, the simulated moving bed apparatus can be configured with a chromatographic bed material that is a reverse phase material, which is a bed material that contains hydrophobic moieties. Non-limiting examples of hydrophobic chromatographic bed materials include resins with C3 through C8 alkyl or alkene moieties, phenyl moieties, styrene resins and the like. Such reverse phase materials may be derivatized to contain the catalyst, or mixed with a different material that contains the solid phase catalyst. The different material need not necessarily be hydrophobic so long as the dominant interaction of the fatty acid monoester with the mixed bed material is hydrophobic. Again, the additions to the chromatographic bed material are the triacylglycerol oil feed stock the alkanol and the optional second catalyst.

Figure 4:
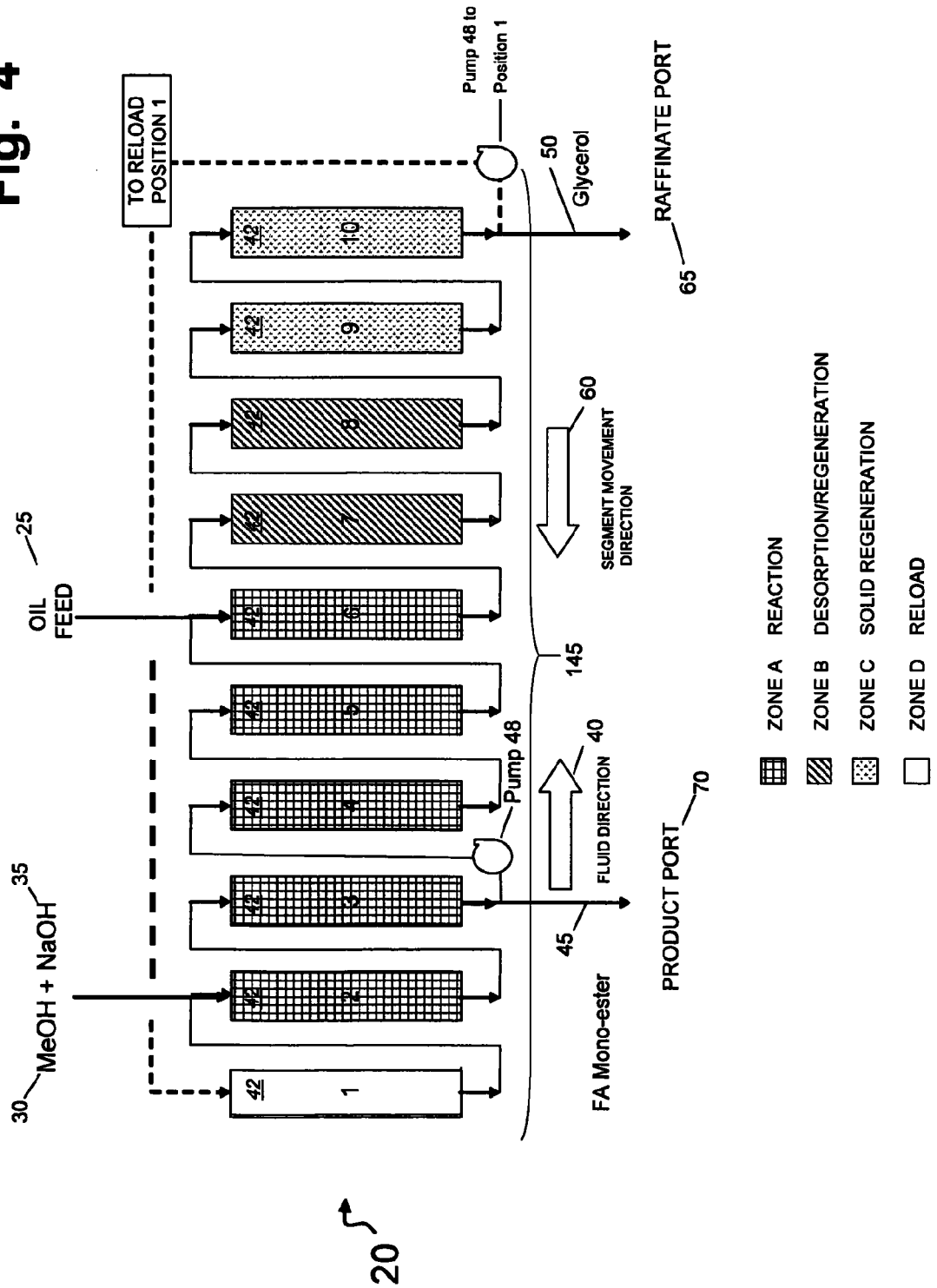
FIG. 4 illustrates an embodiment of a simulated moving bed apparatus configured for simultaneously synthesizing and purifying a fatty acid monoester from acylglycerols and purifying it from coproducts with a hydrophobic chromatographic bed material.

In these embodiments, in contrast to embodiments using a polar chromatographic bed, the principle difference is that the more polar glycerol would preferentially partition with the mobile phase while the less polar fatty acid monoester will preferentially partition with the chromatographic material as the column segments are moved in the counter current direction, as depicted in FIG. 4. The apparatus in FIG. 4 was configured essentially as the apparatus in FIG. 1 except where denoted otherwise. To accomplish the simultaneous reaction and separation using a reverse phase chromatographic material therefore only requires shifting the positions of the raffinate and product ports, and shifting the positions of the oil feed and alkanol eluent ports as depicted in FIG. 4. In this arrangement, the zone positions are reversed, so that the reaction Zone A is in segments 2-6 while the desorption/regeneration Zone B and solid regeneration Zone C are positioned in segments 7-10 and the reload zone D is positioned in segment1. Despite the reversal in position, the, removal of fatty acid monoester product still occurs in Zone A while the separation and regeneration still occur in Zones B and C of continuous chromatographic bed 145 containing nonpolar chromatographic bed material 42.

Figure 5:
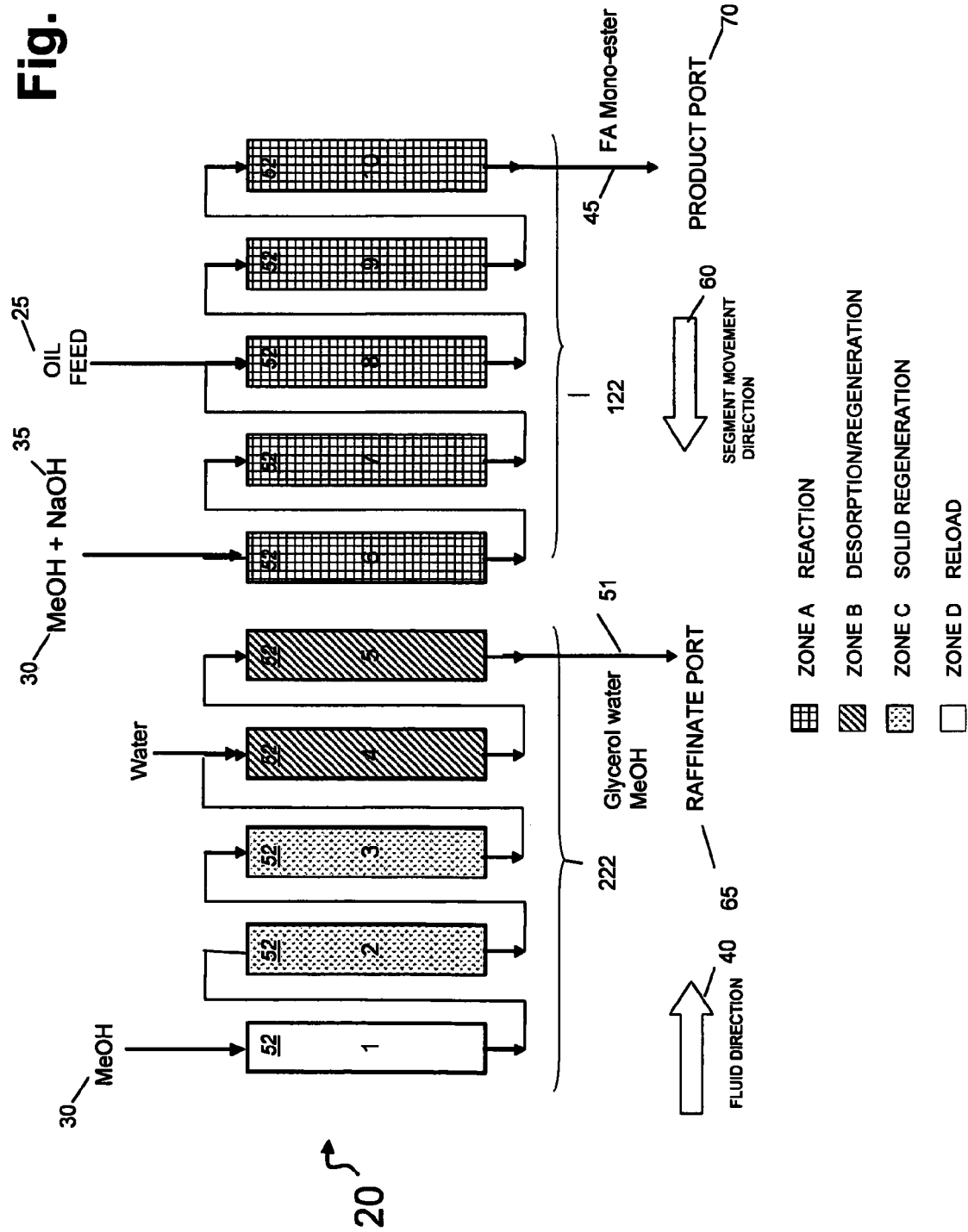
FIG. 5 illustrates an embodiment of a simulated moving bed apparatus configured for simultaneously synthesizing fatty acid methyl esters from acylglycerols and purifying it from coproduct glycerol by adsorptive/desorptive separation.

In yet another aspect, any of the embodiments described herein before may also be used to perform the continuous synthesis and simultaneous continuous separation by absorptive/desorptive chromatographic techniques. As mentioned supra, adsorptive/desorptive chromatographic separation is a discontinuous process that uses a change of eluant conditions to first immobilize a desired species to the matrix and then to subsequently mobilize the bound species so that it moves with the fluid phase. FIG. 5 depicts an exemplary embodiment where adsorptive/desorptive separation is used instead of chromatographic separation. The apparatus in FIG. 5 was configured essentially as the apparatus in FIG. 1 except where denoted otherwise. In this embodiment, two continuous chromatographic beds 122 and 222 comprise an adsorptive/desorptive chromatographic bed material 52. Continuous chromatographic beds 122 and 222 are not connected by any contiguous liquid flow. As column segments pass through the Reaction zone (zone A), glycerol coproduct is adsorbed to the chromatographic bed material 52. At step intervals, column segment 6, laden with adsorbed glycerol, moves into the desorption/regeneration zone (zone B), where glycerol is desorbed by the flow of methanol and water through continuous chromatographic bed 222. As that column segment passes through zone B, zone C, and zone D it is depleted of glycerol and prepared to be returned to the reaction zone (zone A).

The following Examples illustrate exemplary practices are not intended to limit the teachings provided herein. However, to the extent these examples provide support for a more general principle derivable therefrom, for example, conversion of at least 98% of the acylglycerol into fatty acid monoester, the general principle is intended to be a part of the present invention.

EXAMPLES

For guidance to the skilled person, a single-column discontinuous preliminary test used in the art of simulated moving bed chromatography to identify suitable chromatographic conditions for purification of desired compounds may be carried out to define appropriate conditions for any particular embodiment of the present invention. One suitable name for such a test is a "Pulse Test". A pulse test can be carried out by preparing an adsorbent material in a single column. If necessary, a conditioning step can be applied to the adsorbent material before or after it is placed in the column to form a bed. An amount of a first composition (feed) of known composition and containing at least two different compounds is applied to the top of the column. The level of the first composition may be allowed to sink to into the top of the bed. Suitable solvents are applied to the column to selectively elute compounds while collecting column effluent. A fraction collector is suitable for obtaining fractions of the effluent which may be analyzed to determine the effectiveness of the solvents applied in separating the first composition into fractions selectively enriched in compounds contained in the first composition. The concentrations of the compounds in the fractions can then be plotted to provide guidance in optimizing the solvents applied as illustrated in FIGS. 6-13.

Example 1

In this example, the catalytic chromatographic bed comprising a strong base ion exchange resin PA308 Mitsubishi Chemical Co. (Tokyo, Japan) was configured in a 1-2-2-5 sequence in a simulated moving bed (SMB) apparatus in a temperature-controlled cabinet maintained at 55° C. At this temperature, no vapor phase was present in the apparatus. Resin was slurried in methanol and loaded into each of the ten columns containing 300 ml. Zone A was a reaction zone; Zone B was a desorption/regeneration zone; Zone C was a solid regeneration zone, and Zone D was a reload zone (FIG. 1). The SMB apparatus contained 10 columns in a circular series on a carousel, and provisions for rotating the columns in the direction opposite the flow of fluid at defined intervals, called the "Step Time". The step time was 10 minutes. In the 1-2-2-5 sequence, the numbers refer to the quantity of columns in each zone. The initial digit ("1") describes the quantity of columns in a reload zone (Zone D) comprising one column segment; the second digit ("2") describes the quantity of columns in a desorption/regeneration zone (Zone C) comprising two column segments; the third digit ("2") describes the quantity of columns in a desorption/regeneration zone (Zone B); and the fourth digit ("5") describes the quantity of columns in the reaction zone (Zone A).

Zone A (the Reaction Zone) was defined and bracketed by the soybean oil feed (triacylglycerols, TAG) inlet and the product discharge ports. There were 5 columns in this zone (columns 6-10 in FIG. 1). Triacylglycerol feed containing >95% triglycerides ("Feed" in Table 1) obtained from an oilseed plant was applied continuously in the reaction zone at 9.6 ml/min, joining the flow of alkali methanol introduced into the simulated moving bed from a load port in Zone C. The alkali methanol contained about 0.1% wt/wt sodium hydroxide and flowed through the apparatus in a first direction. This solution was prepared by slurrying the second catalyst with methanol before contacting the alkali methanol with the chromatographic bed and acylglycerol feedstock. The ratio of fresh alkali methanol feed to triacylglycerol feed was 1.9. In this example, the ratio of the flow rate through Zone B compared to the flow rate of triacylglycerol feed ("ratio of desorb") was 1.6. Biodiesel synthesis took place in this zone to generate glycerol and biodiesel, and biodiesel product was continuously passed out of the SMB unit at the end of Zone A as "Product" containing >99% fatty acid monoester (Table 1). The primary purpose of this zone was to allow residence time for the interaction of the feed with the methanol and caustic catalysts (both in mobile phase and on the resin), thus allowing for the completion of the reaction.

TABLE 1

| | Feed wt % | Product wt % | Raffinate wt % |
|---|---|---|---|
| Solids | 99.9 | 55.6 | 6.2 |
| Monoglyceride | 0.02 | 0.27 | 0.16 |
| Diglyceride | 0.59 | 0.09 | 0.16 |
| Triglyceride | 95.74 | 0 | 0.64 |
| FFA | 0.04 | 0 | 0.80 |
| FAME | 0.01 | 98.1 | 13.0 |
| Glycerol | 0.01 | 1.53 | 85.2 |

Zone B (the desorption/regeneration zone) was the zone defined by the raffinate discharge and the feed inlet ports (columns 4 & 5 in FIG. 1). The flow in this zone was 15.4 ml/minute. There were 2 columns in this zone. The primary purpose of this zone was to ensure separation of glycerol from the fatty acid monoester by desorption of any retained fatty acid monoester from the resin bed. This both increases the yield and helps to reduce resin fouling.

Zone C (the Solid Regeneration zone) was the zone defined by the alkali methanol (methanol containing 0.1% sodium hydroxide) inlet and the raffinate discharge ports (columns 2 & 3 in FIG. 1). There were 2 columns in this zone. The primary purpose of this zone was to regenerate the resin. The methanol containing 0.1% sodium hydroxide was pumped into this zone through the alkali methanol inlet at 18.2 ml/minute, and it stripped the resin of glycerol and other potential fouling compounds from in Zone A. The sodium hydroxide also helps to retain the hydroxide form of the SBA resin. At the end of the solid regeneration zone, an effluent enriched in coproduct glycerol and depleted of biodiesel was continuously eluted from the simulated moving bed apparatus and allowed to pass out of the apparatus as an effluent labeled "Raffinate" containing 6.2% non-solvent material ("solids")(Table 1). The "solids" material thus comprised monoacylglycerols, diacylglycerols, triacylglycerols, free fatty acids, fatty acid methyl esters, and glycerol, and the percentages of these components in the raffinate are given as a fraction of the "solids" material.

Zone D (the Reload Zone) was the zone bracketed by the product discharge port at the end of column segment 10 and the methanol/second catalyst inlet port at the top of column segment 2 (column 1 in FIG. 1). There was 1 column in this zone. The primary purpose of this zone, in this application, was to prepare the column for the reaction zone. This zone also helped to decrease the volume of methanol required to push the respective wave fronts through the system. The flow in this zone was 10.0 ml/minute, which was sufficient to displace the void fraction methanol from the column. A pump connected to the effluent port at column segment 10 pumped part of the product flow exiting column segment 10 into the reload zone to displace methanol and catalyst from column segment 1 into column segment 2 in preparation for the movement of column segment 1 into the position occupied by column segment 10 and subsequent elution of product 70 from the apparatus.

In this embodiment, the conversion of feed to biodiesel was 100%, and the yield of biodiesel was 98.8% (Table 1). The feed and products were maintained in a liquid state at all times. Thus triacylglycerol and alkali methanol feed were continuously applied to the simulated moving bed apparatus; the triacylglycerol feed was 100% converted to biodiesel fuel ("Product") of 98.1% purity as well as a raffinate enriched in glycerol (85.2%), each being continuously removed from the column. In this manner, continuous simultaneous synthesis and purification of pure biodiesel and glycerol was carried out. The conversion and yield values demonstrate that the amount of fatty acid monoester produced was greater than 98% mol/mol of the amount of fatty acid moieties in the acylglycerol feedstock.

Example 2

The process of Example 1 was carried out substantially as in Example 1 on the same triglyceride feed using Mitsubishi PA 308 resin as a first catalyst, with changes in flow rates indicated in Table 2.

TABLE 2

All values are in percent

|  |  |  | Feed wt % | Product wt % | Raffinate wt % |
|---|---|---|---|---|---|
| TAG ml/min. | 10.28 | Solids | 99.9 | 53.7 | 3.3 |
| MeOH* ml/min. | 26.94 | Monoglyceride | 0.02 | 0.18 | 0.66 |
| Desorb ml/min. | 25.45 | Diglyceride | 0.59 | 0.00 | 1.31 |

TABLE 2-continued

All values are in percent

|  |  |  | Feed wt % | Product wt % | Raffinate wt % |
|---|---|---|---|---|---|
| Reload ml/min. | 10.0 | Triglyceride | 95.74 | 0.00 | 0.5 |
| Product ml/min. | 25.73 | FFA | 0.04 | 0.36 | 0.22 |
| Raffinate ml/min. | 11.30 | FAME | 0.01 | 99.1 | 18.1 |
| Conversion, % | 100.0 | Glycerol | 0.01 | 0.36 | 79.0 |
| Yield, % | 99.4 |  |  |  |  |
| Ratio MeOH/TAG | 2.6 |  |  |  |  |

*MeOH = methanol containing 0.1% sodium hydroxide.

In this embodiment, the conversion of feed (TAG) to biodiesel was 100%, and the yield of biodiesel was 99.4% (Table 1). Again, the triacylglycerol and alkali methanol feed were continuously applied to the simulated moving bed apparatus; the triglyceride feed was 100% converted to biodiesel ("Product) this time of 99.1% purity as well as a raffinate enriched in glycerol (79.0%), each being continuously removed from the column. The conversion and yield values demonstrate that the amount of fatty acid monoester produced was greater than 98% mol/mol of the amount of fatty acid moieties in the acylglycerol feedstock.

Example 3

The process of Example 1 was carried out substantially as in Example 1 on the same acylglycerol feed, with the flow rates and results indicated in Table 3.

TABLE 3

All values are in percent

|  |  |  | Product wt % | Raffinate wt % |
|---|---|---|---|---|
| TAG ml/min. | 9.64 | Solids | 58.9 | 0.06 |
| MeOH* ml/min. | 17.0 | Monoglyceride | 0.27 | 0.1 |
| Desorb ml/min. | 18.15 | Diglyceride | 0.00 | 0.2 |
| Reload ml/min. | 10.0 | Triglyceride | 0.00 | 0.1 |
| Product ml/min. | 17.79 | FFA | 0.09 | 0.9 |
| Raffinate ml/min. | 8.87 | FAME | 98.81 | 14.4 |
| Conversion, wt % | 100.0 | Glycerol | 0.82 | 84.3 |
| Yield, wt % | 99.0 |  |  |  |
| Ratio MeOH/TAG | 1.76 |  |  |  |

*MeOH = methanol containing 0.1% sodium hydroxide.

The conversion and yield values demonstrate that the amount of fatty acid monoester produced was greater than 98% mol/mol of the amount of fatty acid moieties in the acylglycerol (TAG) feedstock.

Example 4

The process of Example 1 was carried out substantially as in Example 1 same triglyceride feed, with the flow rates and results indicated in Table 4.

TABLE 4

All values are in percent

|  |  |  | Product wt % | Raffinate wt % |
|---|---|---|---|---|
| TAG ml/min. | 10.19 | Solids | 48.7 | 0.02 |
| MeOH* ml/min. | 19.03 | Monoglyceride | 0.41 | 0.3 |

TABLE 4-continued

All values are in percent

|  |  |  | Product wt % | Raffinate wt % |
|---|---|---|---|---|
| Desorb ml/min. | 22.36 | Diglyceride | 0.00 | 0.5 |
| Reload ml/min. | 10.0 | Triglyceride | 0.00 | 12.8 |
| Product ml/min. | 22.55 | FFA | 0.16 | 1.4 |
| Raffinate ml/min. | 6.39 | FAME | 96.84 | 23.5 |
| Conversion, wt % | 100% | Glycerol | 2.59 | 61.5 |
| Yield, wt % | 99.1% |  |  |  |
| Ratio MeOH/TAG | 1.86 |  |  |  |

*MeOH = methanol containing 0.1% sodium hydroxide.

The conversion and yield values demonstrate that the amount of fatty acid monoester produced was greater than 98% mol/mol of the amount of fatty acid moieties in the acylglycerol (TAG) feedstock.

Example 5

In this example, pulse tests were carried out to demonstrate the use of other chromatographic bed materials to execute the synthesis of biodiesel and glycerol from vegetable oil and methanol. Chromatographic bed material was conditioned by slurry packing it with deionized water into a 15 mm ×600 mm jacketed glass column and rinsing the bed (100 ml bed volume) thus formed with 3 bed volumes (BV) of deionized water. Five BV of a 5 percent solution of sodium hydroxide in deionized water was then passed through the bed to ensure enrichment in alkali content of the bed and, in the case of acid chromatographic bed material, to convert it to the basic (alkali) form. The bed was rinsed with 5-10 BV of deionized water to remove free sodium hydroxide and allowed to sit overnight in deionized water. In the morning the column bed was rinsed with 3 BV of deionized water, then 3 BV of methanol were passed through the column to displace water. The column was then allowed to sit 24-48 hours, and then given a final methanol rinse (2-3 BV) to obtain a conditioned column. To start the pulse test, three bed volumes of methanol containing 0.2 percent sodium hydroxide was pumped through the bed from the top, and the level was allowed to sink to the top of the resin bed. A pulse test was carried out by heating the column to 45 degrees C., applying an aliquot ("pulse") of soybean oil to the top of the column and allowing the level of soybean oil to sink into the very top of the bed. Five ml of methanol containing 0.2 percent sodium hydroxide was added to the column on top of the bed. Subsequently, three bed volumes (BV) of methanol containing 0.2 percent sodium hydroxide was pumped onto the top of the column at 10 ml/min. Column effluent was collected in sample tubes in a fraction collector (38samples) with a 0.8 minute step interval to obtain 8 ml samples of column effluent. All liquids flowing into and out of the column were maintained in the liquid phase throughout the experiment. After fraction collection, all the tubes contained a yellow liquid, which was analyzed for composition.

TABLE 5

| Example | Bed material | Manufacturer | Pulse volume (ml) |
|---|---|---|---|
| 5.1 | Sybron MP600-WC | Bayer (Pittsburg, PA) | 15 |
| 5.2 | PA308 | Mitsubishi (Tokyo, Japan) | 15 |
| 5.3 | SD2 | Dow (Midland, MI) | 10 |
| 5.4 | Spherical Silica | Makall (Quindao, China) | 25 |
| 5.5 | Spherical Alumina | LaChemCo (Gramercy, LA) | 10 |
| 5.6 | Spherical Alumina | LaChemCo (Gramercy, LA) | 25 |
| 5.7 | SP 70 | Mitsubishi (Tokyo. Japan) | 10 |
| 5.8 | Sybron K2629 | Bayer (Pittsburg, PA) | 15 |

Figure 6:
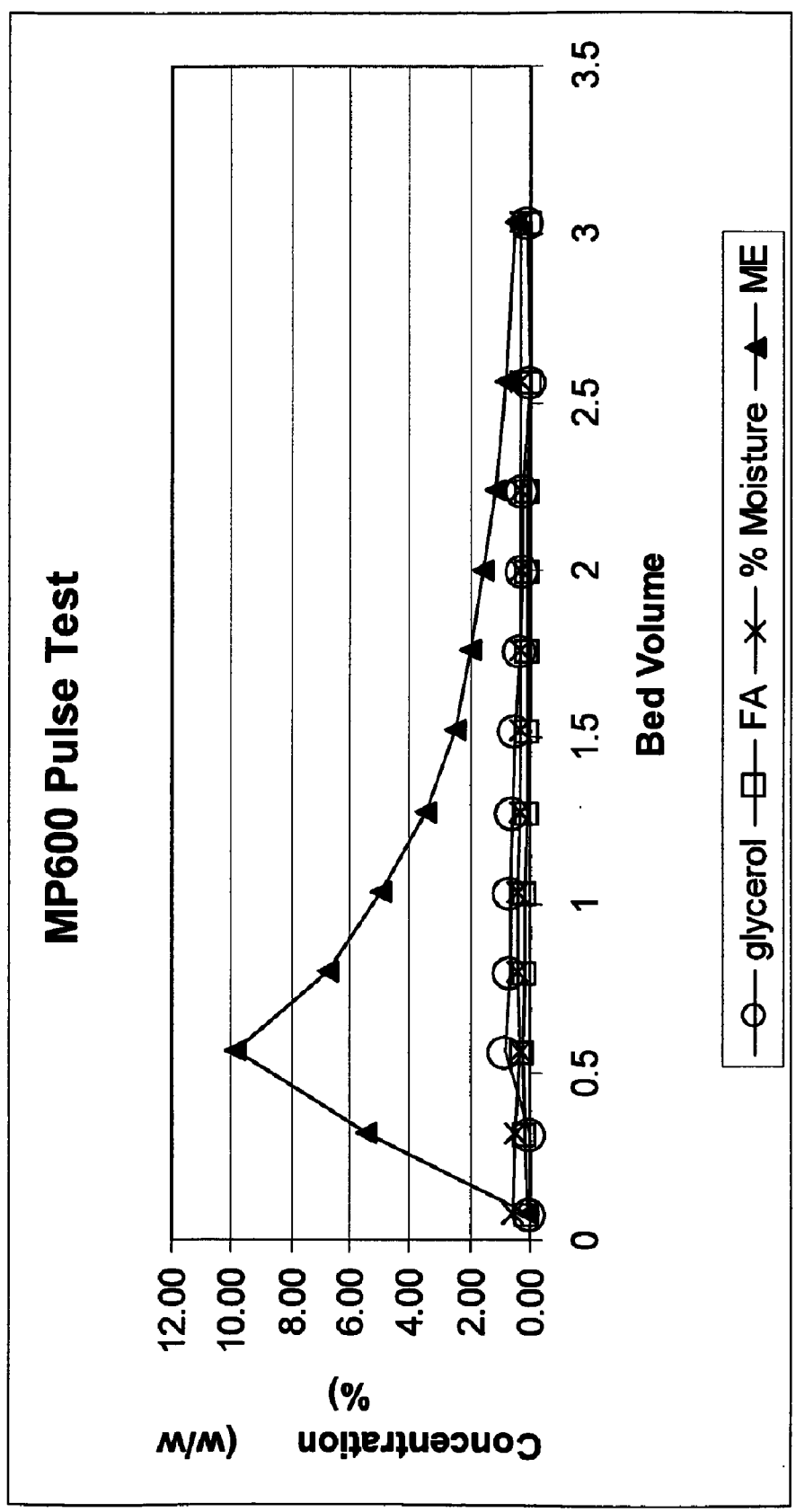
FIG. 6 illustrates the elution profile of a pulse test from example 5.1 using a single column loaded with Sybron MP600 strong base resin from Bayer (Pittsburg, Pa.).
Figure 7:
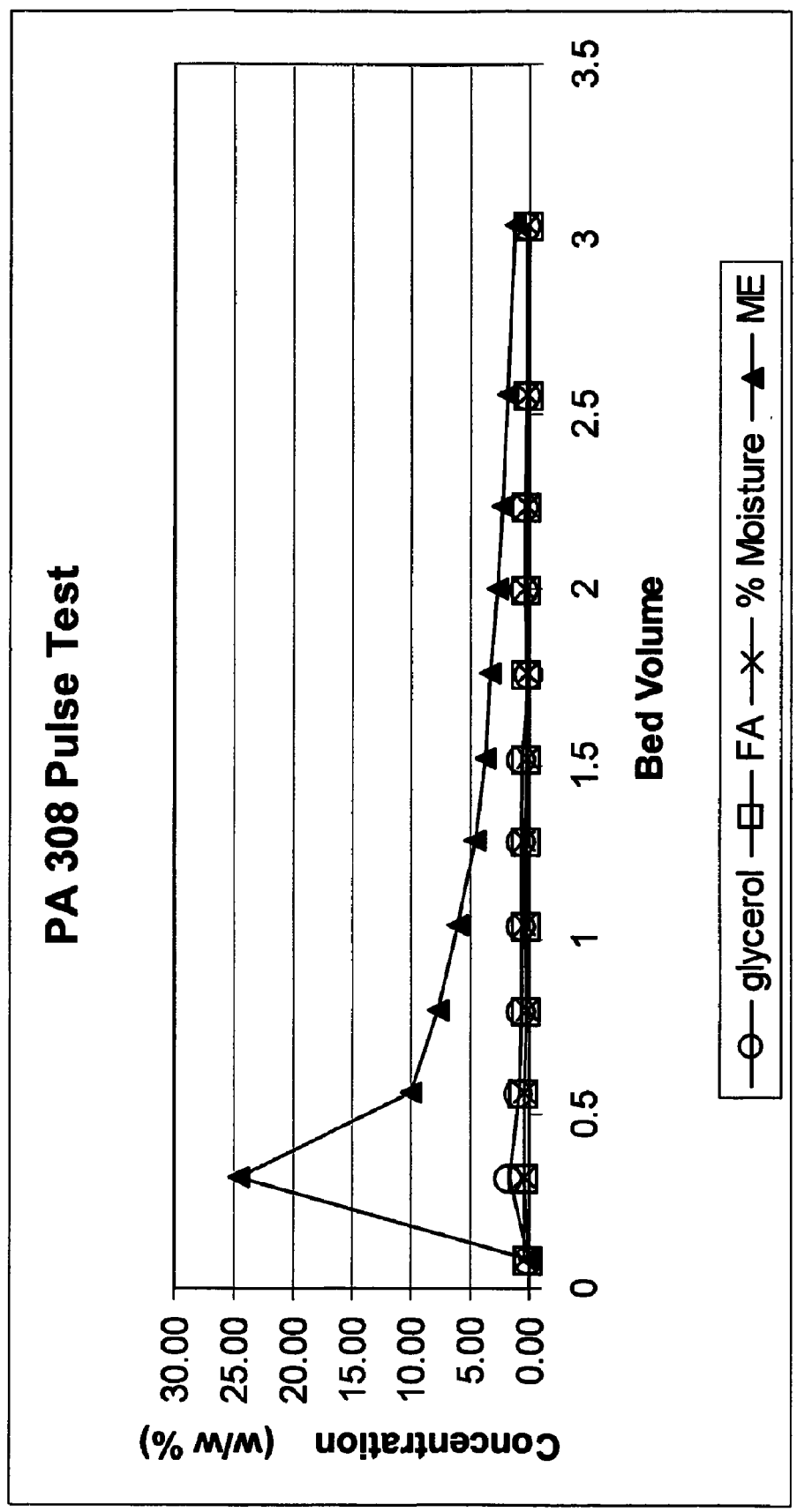
FIG. 7 illustrates the elution profile of a pulse test from example 5.2 using a single column loaded with PA308 strong base resin from Mitsubishi (Tokyo, Japan)
Figure 8:
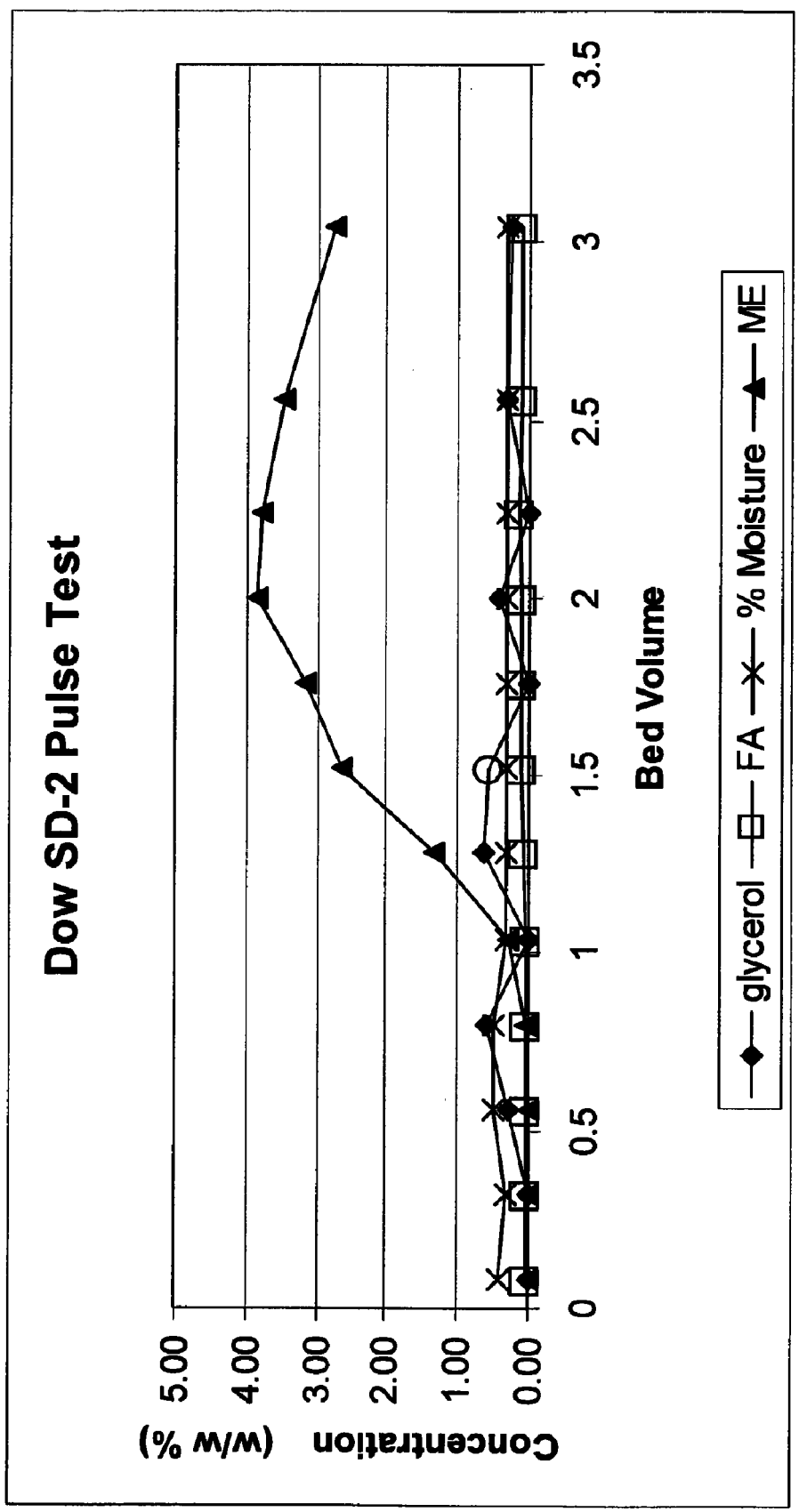
FIG. 8 illustrates the elution profile of a pulse test from example 5.3 using a single column loaded with weak base resin SD2 from Dow Chemical Co. (Midland, Mich.).
Figure 9:
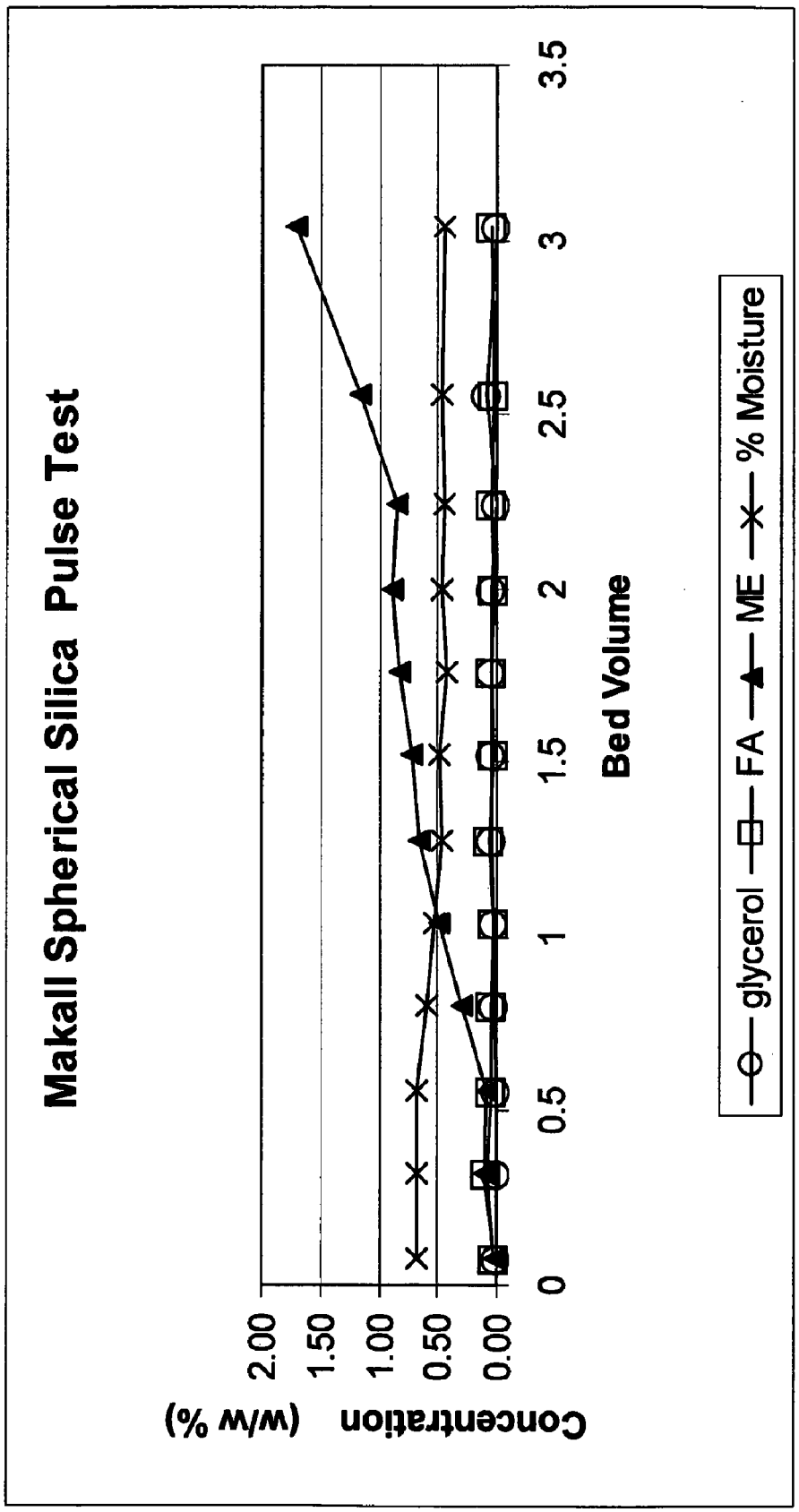
FIG. 9 illustrates the elution profile of a pulse test from example 5.4 using a single column loaded with Spherical Silica (Makall Group Inc., Quindao, China).
Figure 10:
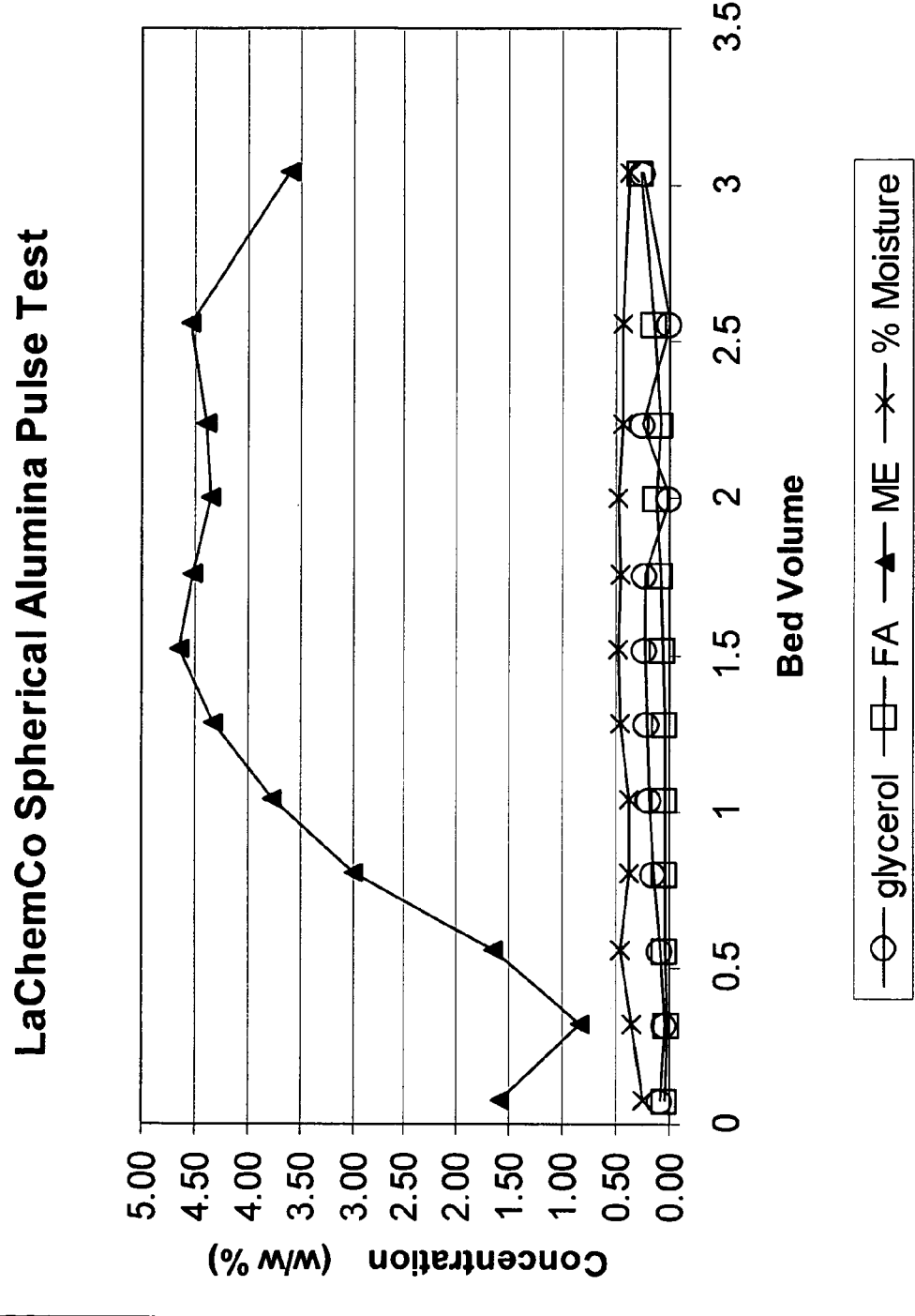
FIG. 10 illustrates the elution profile of a pulse test from example 5.5 using a single column loaded with Spherical Alumina (LaChemCo, Gramercy, La.).
Figure 11:
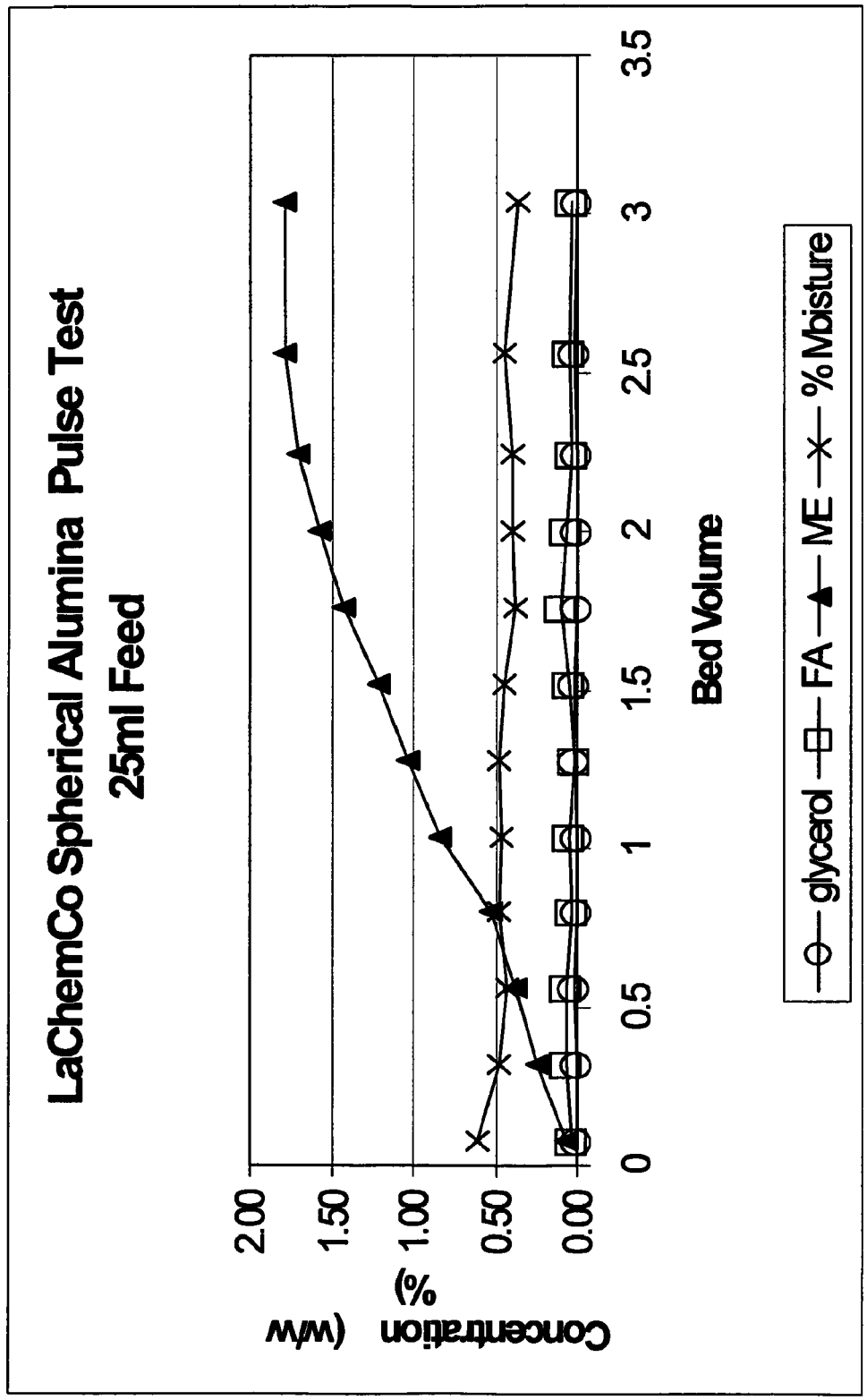
FIG. 11 illustrates the elution profile of a pulse test from example 5.6 using a single column loaded with Spherical Alumina (LaChemCo, Gramercy, La.).
Figure 12:
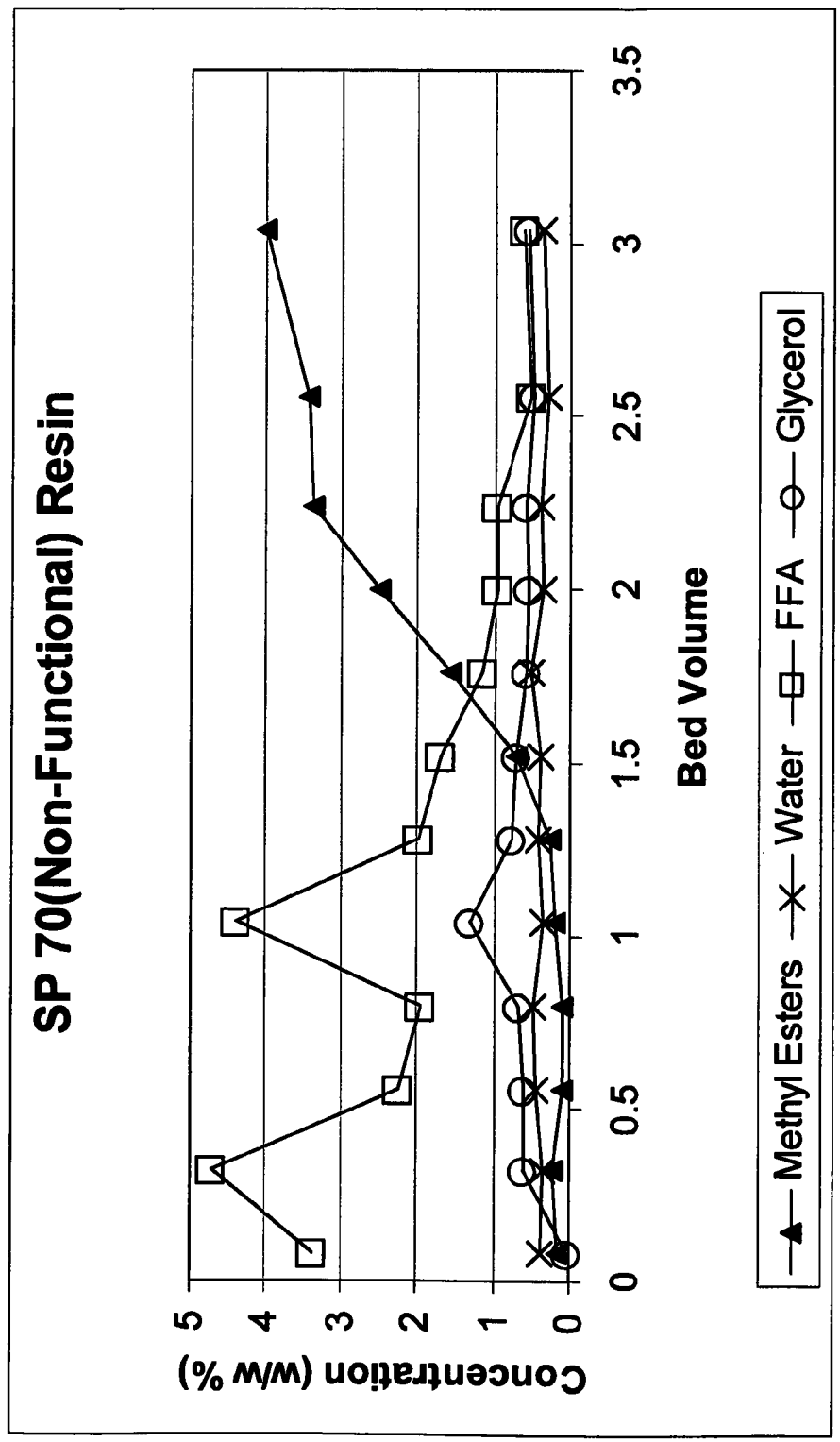
FIG. 12 illustrates the elution profile of a pulse test from example 5.7 using a single column loaded with a nonfunctional resin SP 70 (Mitsubishi, Tokyo, Japan).
Figure 13:
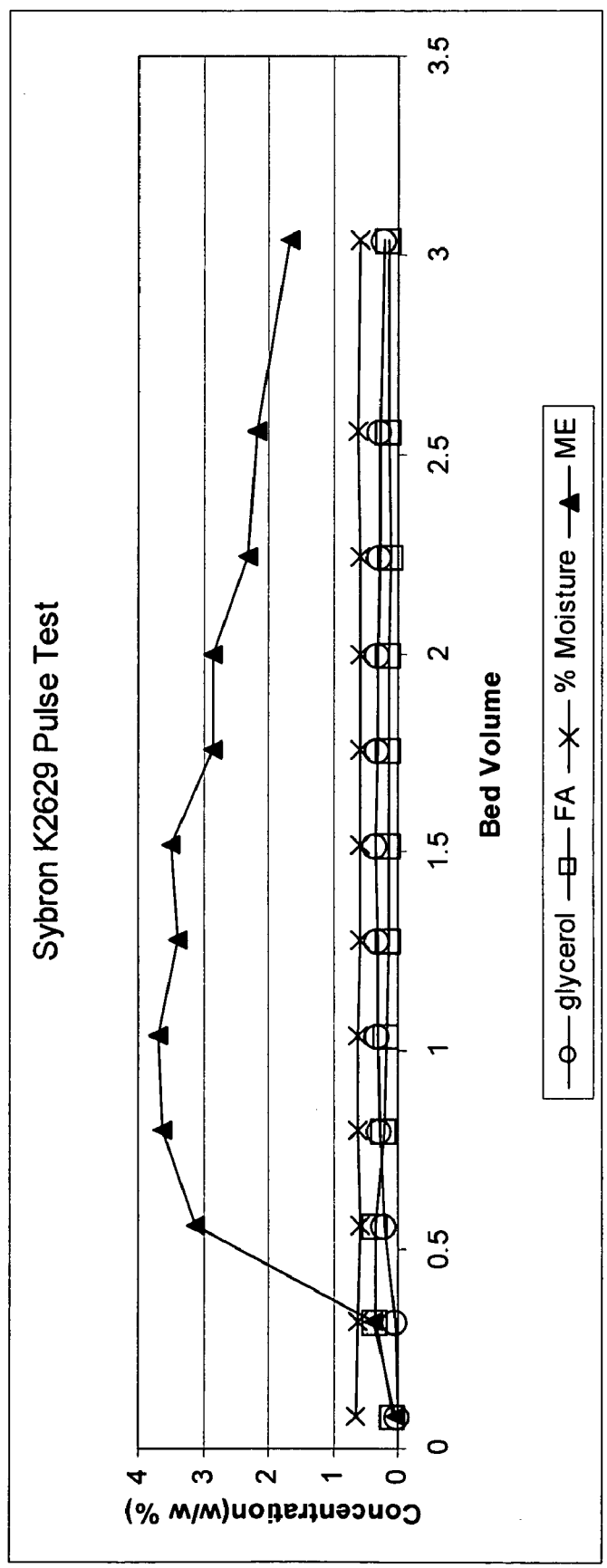
FIG. 13 illustrates the elution profile of a pulse test from example 5.8 using a single column loaded with strong acid resin Sybron K2629 (Bayer, Pittsburg, Pa.).

The elution profiles of Examples 5.1-5.8 are shown in FIGS. 6-13. In FIGS. 6-7, the elution profiles of strong base resins (examples 5.1-5.2) are shown. In FIG. 8. the elution profile of a weak base resins (example 5.3) is shown. Fractions enriched in ME (methyl esters, also known as fatty acid methyl esters, or biodiesel) and having low contents of glycerol, fatty acids and water (moisture) were evident in each case. The skilled artisan could use these elution profiles to transfer the process to a simulated moving bed construction without undue experimentation. FIGS. 9-11 show pulse tests using a non-catalytic chromatographic mineral bed material (examples 5.4-5.6). Although the amount of water eluting in each fraction was somewhat greater than in FIGS. 6-8, the skilled artisan could use these elution profiles to transfer the process to a simulated moving bed construction without undue experimentation. FIG. 12 shows the results of a pulse test using a non-catalytic chromatographic resin bed material (example 5.7). Free fatty acids (FFA or FA), and glycerol eluted from the column predominantly in bed volumes 0-1.5; Methyl esters eluted primarily in bed volumes 1.5-3. The skilled artisan could use this elution profile to transfer the process to a simulated moving bed construction without undue experimentation. FIG. 13 shows the results of a pulse test using a strong acid resin that had been converted to the sodium form (example 5.8) and operated as in FIG. 3. Fractions enriched in methyl esters and having low contents of glycerol, fatty acids and water (moisture) eluted over 0.5-3.0 bed volumes. The skilled artisan could use these elution profiles to transfer the process to a simulated moving bed construction without undue experimentation.

Example 6

The process of Example 1 was carried out substantially as in Example 1 on the same triglyceride feed (TAG), with the flow rates and results indicated in Table 6.

TABLE 6

|  |  |  | Product wt % | Raffinate wt % |
|---|---|---|---|---|
| TAG ml/min. | 10.22 | Solids | 57384 | 4.81 |
| MeOH* ml/min. | 16.8 | Monoglyceride | 0.54 | 0.56 |
| Desorb ml/min. | 23.2 | Diglyceride | 0.07 | 0.22 |
| Reload ml/min. | 10 | Triglyceride | 0.00 | 0.00 |
| Product ml/min. | 23.42 | FFA | 0.43 | 5.74 |
| Raffinate ml/min. | 3.93 | FAME | 94.59 | 26.10 |
| Conversion, wt % | 100.0 | Glycerol | 4.36 | 67.38 |
| Yield, wt % | 99.3 |  |  |  |
| Ratio MeOH/TAG | 1.67 |  |  |  |

*MeOH = methanol containing 0.1% sodium hydroxide.

The chloride content of the product and raffinate were measured to demonstrate that the removal of sodium chloride from the glycerol stream is not required using processes of the present disclosure. The chloride content of the fatty acid methyl ester product was 18.2 parts per million, and the chloride content of the glycerol raffinate was 95.5 parts per million. The conversion and yield values demonstrate that the amount of fatty acid monoester produced was greater than 98% mol/mol of the amount of fatty acid moieties in the acylglycerol feedstock.

What is claimed is:

1. A process for simultaneously synthesizing and purifying a fatty acid monoester and glycerol comprising, contacting a chromatographic bed material comprising a first basic ion exchange resin catalyst with an acylglycerol feedstock, a monohydric alcohol and a second catalyst comprising sodium hydroxide in a concentration range of 0.005% to 0.5% by weight relative to the monohydric alcohol to form the fatty acid monoester, while simultaneously separating a fraction enriched with the fatty acid monoester from a fraction enriched with glycerol by sorbent chromatography through the chromatographic bed material.

2. The process of claim 1 wherein the sorbent chromatography comprises a chromatographic separation.

3. The process of claim 1 wherein the sorbent chromatography comprises an adsorptive/desorptive separation.

4. The process of claim 1 wherein the chromatographic bed material comprises a strong base resin.

5. The process according to claim 1 wherein the amount of fatty acid monoester produced is at least 98 mole percent of the amount of fatty acid moieties in the acylglycerol feedstock.

6. The process of claim 1 wherein the second catalyst is contacted with the monohydric alcohol prior to contacting the chromatographic bed and acylglycerol feedstock.

7. The process of claim 1 wherein the monohydric alcohol is selected from the group consisting of methanol and ethanol.

8. The process of claim 1, wherein none of the acylglycerol feedstock, the monohydric alcohol, the first basic catalyst, or the second catalyst are in a vapor phase.

9. The process of claim 1 wherein the chromatographic bed material is contained within a simulated moving bed apparatus.

10. The process of claim 9 wherein the simulated moving bed apparatus comprises a plurality of movable column segments connected in sequential fluid series and including in order, an eluent port to introduce the monohydric alcohol into the apparatus to contact the chromatographic bed material, a raffinate port to remove the glycerol from the apparatus, a feed port to introduce the acylglycerol into the apparatus to contact the chromatographic bed material, and a product port to remove the fatty acid monoester from the apparatus.

11. The process of claim 10 wherein the column segments are sequentially connected in a circular series.

12. The process of claim 11 wherein the monohydric alcohol flows through the simulated moving bed apparatus in a first flow direction and the column segments are collectively moved in a second direction opposite the first direction.

13. The process of claim 9 wherein the simulated moving bed apparatus comprises a plurality of column segments sequentially fluidly interconnected by moveable ports that include in order, an eluent port to introduce the monohydric alcohol into the apparatus to contact the chromatographic bed material, a raffinate port to remove the glycerol from the apparatus, a feed port to introduce the acylglycerol into the apparatus to contact the chromatographic bed material, and a product port to remove the fatty acid monoester from the apparatus.

14. The process of claim 13 wherein the moveable ports are moved in a circular sequence relative to the column segments.

15. The process of claim 13 wherein the monohydric alcohol is introduced into the simulated moving bed apparatus in a first flow direction and the moveable ports are collectively moved to adjacent column segments in the same direction to simulate movement of the bed segments in a second direction opposite the first direction.

16. The process of claim 1, wherein the contacting of the chromatographic bed material with the monohydric alcohol, acylglycerol feedstock and first catalyst with simultaneous sorbent chromatographic separation are conducted continuously with removal of the glycerol enriched effluent and removal of fatty acid monoester enriched effluent.

17. The process of claim 1 wherein the acylglycerol feedstock is contacted with the chromatographic bed material in a first zone and the glycerol is withdrawn from a second zone different than the first.

18. The process of claim 17 further including contacting the chromatographic bed with the monohydric alcohol in a third zone located upstream of the first and second zones with respect to a flow direction of the monohydric alcohol.

19. The process of claim 18 further including contacting the chromatographic bed with the monohydric alcohol in the absence of any other catalyst in a fourth zone located between the first zone and the third zone.

20. A process for simultaneously synthesizing and purifying a fatty acid monoester comprising, in a simulated moving bed apparatus comprising a plurality of column segments sequentially connected in series and containing a catalytic chromatographic bed material comprising a first basic ion exchange resin catalyst, simultaneously continuously:

a. feeding an acylglycerol feedstock into the apparatus at a feed port position to contact the chromatographic bed material at a column segment in a first zone;

b. feeding a second liquid catalyst comprising sodium hydroxide in a concentration range of 0.005% to 0.5% by weight relative to a monohydric alcohol, and a monohydric alcohol eluent reactant into the apparatus at an eluent port position to contact the chromatographic bed material at a column segment in a second zone;

c. flowing the monohydric alcohol eluent reactant in a first direction toward the first zone to contact the acylglycerol feedstock and moving the plurality of column segments in a second direction opposite the first direction;

d. removing a first effluent enriched in the fatty acid monoester from a product port positioned within the first zone and downstream of the feed port position with respect to the first direction; and e. removing a second effluent enriched in glycerol from a raffinate port position in the second zone upstream of the feed port with respect to the first direction.

21. A biodiesel fuel production facility comprising a simulated moving bed apparatus configured to operate any one of the processes according to claims 1-3, 4, 5-7 and 8-9.

22. The process according to claim 20 wherein the monohydric alcohol serves as both a reactant and an eluent.

23. A process for simultaneously synthesizing and purifying glycerol comprising, contacting a chromatographic bed material comprising a first basic ion exchange resin catalyst with an acylglycerol feedstock, a monohydric alcohol and a second catalyst comprising sodium hydroxide in a concentration range of 0.005% to 0.5% by weight relative to the monohydric alcohol to form glycerol while simultaneously separating a fraction enriched with the glycerol from a fraction enriched with fatty acid methyl ester by sorbent chromatography through the chromatographic bed material.

24. The process of claim 1 wherein the chromatographic bed material is selected from the group consisting of a strong base resin, a weak base resin, a strong acid resin, a weak acid resin, a nonfunctional resin, and a nonfunctional solid and combinations of any thereof.

25. A process for simultaneously synthesizing and purifying a fatty acid monoester and glycerol comprising,
   contacting a chromatographic bed material comprising a first basic ion exchange resin catalyst with an acylglycerol feedstock, a monohydric alcohol and a second catalyst comprising sodium hydroxide in a concentration range of 0.005% to 0.5% by weight relative to the monohydric alcohol to form the fatty acid monoester, while simultaneously separating a fraction enriched with the fatty acid monoester from a fraction enriched with glycerol by sorbent chromatography through the chromatographic bed material; wherein, the amount of fatty acid monoester produced is greater than 98% of the amount of fatty acid moieties in the acylglycerol feedstock.

* * * * *